United States Patent
Ayanoglu et al.

[11] Patent Number: 6,122,759
[45] Date of Patent: *Sep. 19, 2000

[54] METHOD AND APPARATUS FOR RESTORATION OF AN ATM NETWORK

[75] Inventors: Ender Ayanoglu, Red Bank; Kai Yin Eng, Middletown, both of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/541,984

[22] Filed: Oct. 10, 1995

[51] Int. Cl.$^7$ .................................................. G06F 13/00
[52] U.S. Cl. .................................... 714/57; 714/47; 714/4
[58] Field of Search ........................ 395/182.02, 185.01, 395/185.1, 200.1, 200.11, 200.12, 200.16, 300.11, 413, 60; 379/60; 714/57, 47, 4

[56] References Cited

U.S. PATENT DOCUMENTS

| | | | |
|---|---|---|---|
| 4,398,063 | 8/1983 | Hass et al. | 179/2 EB |
| 5,168,498 | 12/1992 | Adams et al. | 370/95.1 |
| 5,212,806 | 5/1993 | Natarajan | 455/33.2 |
| 5,295,154 | 3/1994 | Meire et al. | 375/1 |
| 5,343,512 | 8/1994 | Wang et al. | 379/59 |
| 5,371,738 | 12/1994 | Moelard et al. | 370/85.1 |
| 5,406,550 | 4/1995 | McTiffin | 370/18 |
| 5,412,654 | 5/1995 | Perkins | 370/94.1 |
| 5,484,065 | 1/1996 | Acampora et al. | 370/60.1 |
| 5,490,139 | 2/1996 | Baker et al. | 370/60 |
| 5,497,504 | 3/1996 | Acampora et al. | 455/33.2 |
| 5,506,847 | 4/1996 | Shobatake | 370/94.3 |
| 5,528,516 | 6/1996 | Yemini et al. | 364/551.01 |
| 5,528,583 | 6/1996 | Acampora et al. | 370/54 |
| 5,530,963 | 6/1996 | Moore et al. | 395/200.15 |
| 5,533,025 | 7/1996 | Ahmadi et al. | 370/94.1 |
| 5,550,816 | 8/1996 | Hardwick et al. | 370/60 |
| 5,590,125 | 12/1996 | Acampora et al. | 370/397 |
| 5,590,126 | 12/1996 | Mishra et al. | 370/329 |

OTHER PUBLICATIONS

Chalmtac et al., Making Transmission schedules Immune to Topology Changes in Multi–Hop Packet Radio Networks, Transaction on Networks, vol.2, No. 1, pp. 23–29, Feb. 1994.

*Primary Examiner*—Robert W. Beausoliel, Jr.
*Assistant Examiner*—Norman Michael Wright

[57] ABSTRACT

The present invention is a restoration scheme for an ad-hoc ATM LAN wherein ATM cells are transported over a wireless point-to-point link. A method for restoring communications in the ATM network includes the steps of: generating a failure message indicative of a failure of a network element, the failure message including an identification of said network element and a predetermined VPI/VCI reserved for failure reporting; communicating the failure message to all said switching nodes in said network; and referencing updated routing tables at said switching nodes, wherein said network element indicated in said failure message is eliminated from routes in said network. Each of the switching nodes is included in a network tree spanning all said switching nodes in the network, wherein each of the switching nodes is included as a root in a specific network tree, each said network tree having a tree identification, the failure message further including a tree identification field containing the tree identification. The method also includes the step of routing the failure message in the switching nodes of the network based on the tree identification. The failure message includes a time stamp indicative of the time said failure message was generated, and the referencing of the updated routing tables is delayed a predetermined time period from the time of said time stamp before referencing said updated routing tables.

17 Claims, 11 Drawing Sheets

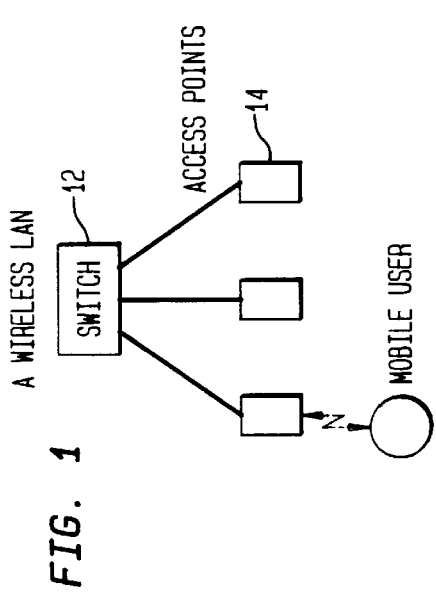

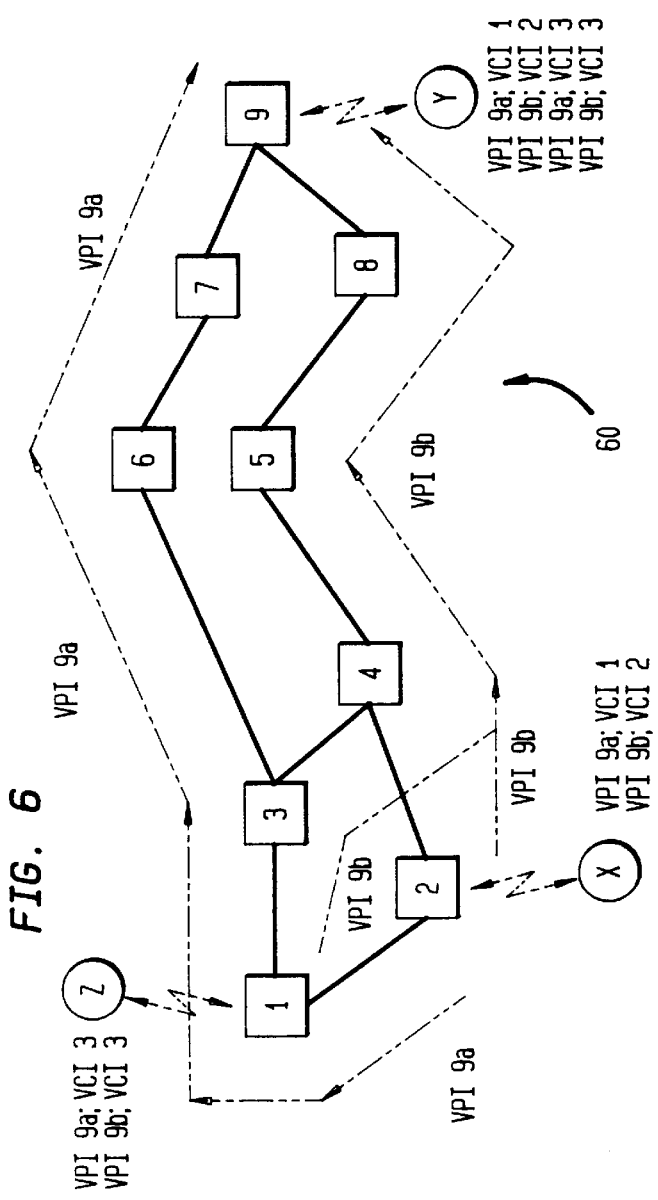
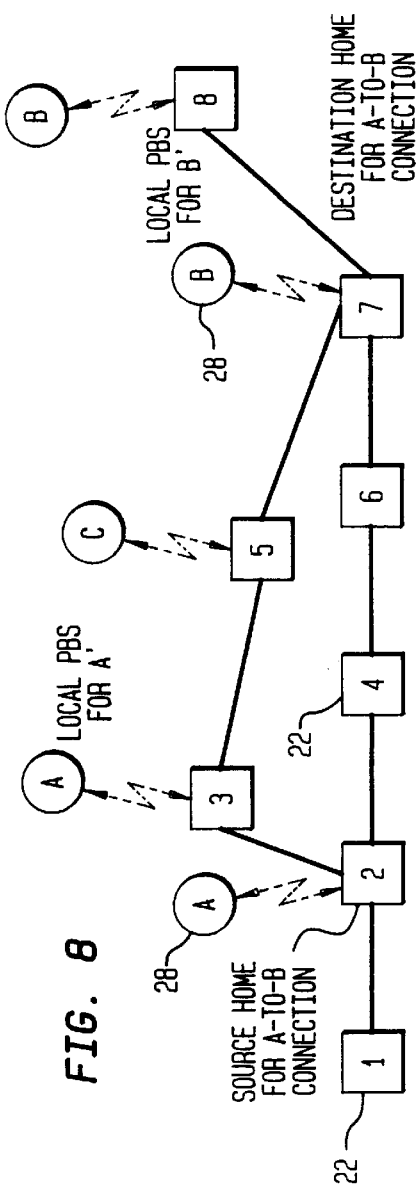
FIG. 6
FIG. 8

| INPUT PORT/ DESTINATION ID | OUTPUT PORT |
|---|---|
| ⋮ | ⋮ |
| 1/1a | 2 |

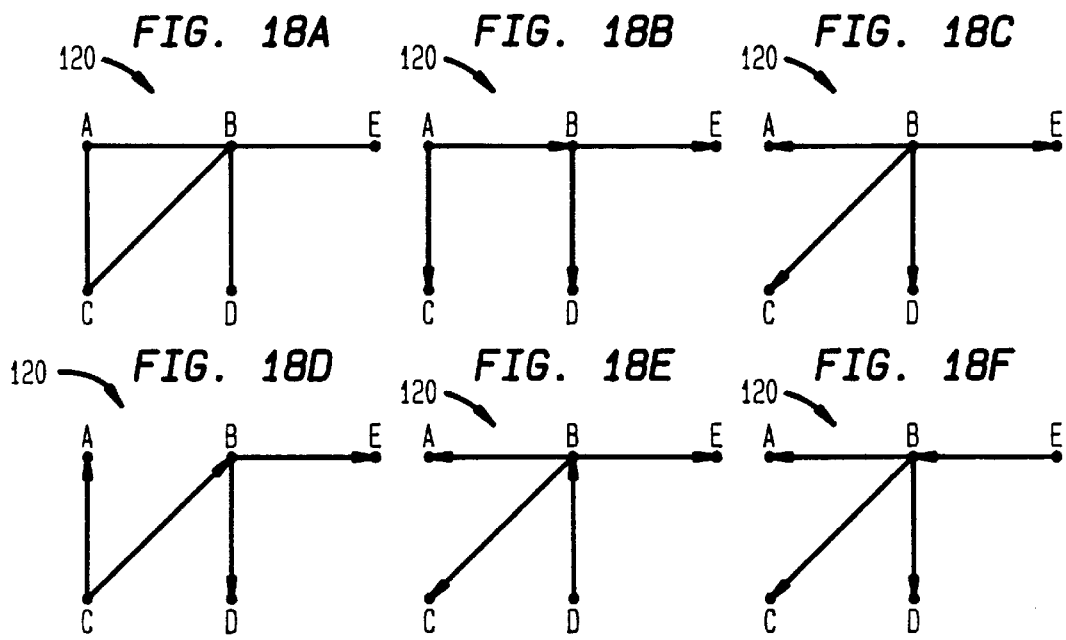
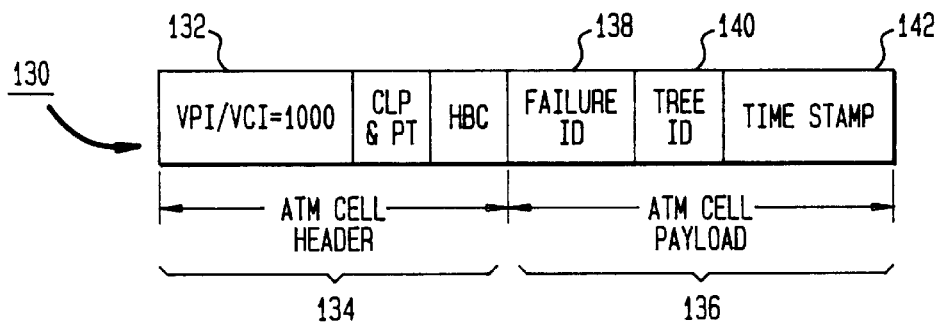
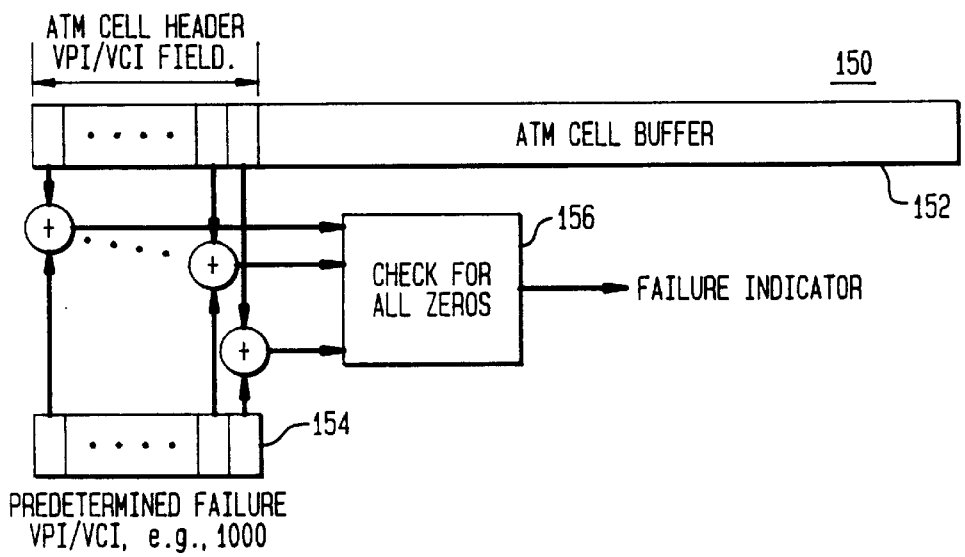

METHOD AND APPARATUS FOR RESTORATION OF AN ATM NETWORK

RELATED APPLICATIONS

The present patent application is related to U.S. patent application Ser. Nos. 08/490,980 and 08/541,985 entitled SIGNALING AND CONTROL ARCHITECTURE FOR AN AD-HOC ATM LAN and DATA LINK LAYER PROTOCOL FOR TRANSPORT OF ATM CELLS OVER A WIRELESS LINK, those applications having at least one common inventor and common assignee and being incorporated herein by reference.

FIELD OF THE INVENTION

The present invention relates to packet-based telecommunications networks, and more particularly to a restoration mechanism for use in ATM networks having wireless links.

BACKGROUND OF THE INVENTION

ATM (Asynchronous Transfer Mode) technology is maturing rapidly for telecommunications as well as computer networking applications. The prospect of an "all ATM" scenario from wide-area network (WAN) to local-area network (LAN) is becoming increasingly promising. Discussions on "ATM to the desktop" have begun to appear in various technical circles, particularly those interested in multimedia applications. Wireless communications, on the other hand, has gained global acceptance and popularity in the cellular voice market. Emerging wireless services such as PCS (Personal Communications Service) are threatening to replace traditional wired telephone and low-rate data access systems. Wireless LAN products (e.g., WaveLan in the Mb/s range) have already found their way in the commercial marketplace. Extending ATM from the LAN/WAN infrastructure towards the wireless user is a is a formidable task.

The ATM protocol is intended for transmission on a reliable physical layer such as optical fibers. Wireless links, on the other hand, are notorious for their unreliability and poor bit error rates. Thus, overcoming this incompatibility at the onset is a major challenge.

Another important aspect of wireless networking is the user mobility. The whole concept of ATM VP/VC (virtual path/virtual circuit) has been centered on fixed point end users. Although other research efforts have discussed the use of ATM in wireless networks, they have been limited to centralized architectures 10 with wireless access links as shown in FIG. 1. The centerpiece in FIG. 1 is the ATM switch 12 providing centralized cell routing and mobility management in the entire system. Even though some distributed functions may be assigned to the access points 14, the system intelligence for mobility management resides at the ATM switch 12. The access points are "hardwired" to the central switch while the wireless links serve as extension cords to the users.

It is recognized that wired networks are here to stay, and ATM has the potential to become ubiquitous. In such a case, there will be standard ATM interfaces on workstations, computer servers, and other peripherals attached to a LAN. Therefore, it is advantageous for a wireless LAN to support ATM cell transport directly into the terminals so as to minimize protocol conversion. As exemplified in FIG. 2, the wireless LAN 16 carries "Wireless ATM" (WATM) whereas the WAN 18 carries (standard) ATM, with a WATM/ATM converter 19 (or gateway) in between. An ideal goal for seamless networking would strive for the elimination of the WATM/ATM converter 19. This is unrealistic because wireless link layer protocols need to be designed differently in order to cope with the poor transmission channel characteristics. Furthermore, this idealistic goal is unnecessary because WATM can be designed essentially the same as ATM except for some header byte redefinition and thus keeping the WATM/ATM gateway very simple. A reliable data protocol and restoration technique that preserves the overall ATM data structure and minimizes changes in the header would contribute significantly to the practical realization of Wireless ATM.

SUMMARY OF THE INVENTION

The present invention is a restoration scheme for an ad-hoc ATM LAN wherein ATM cells are transported over a wireless point-to-point link. In a preferred embodiment of the invention a method of restoring communications in the ATM network is described, wherein the network includes a plurality of network elements including network links and network switching nodes, the network switching nodes adapted for communications with wireless mobile devices. The method includes the steps of: generating a failure message indicative of a failure of a network element, said failure message including an identification of said network element and a predetermined VPI/VCI reserved for failure reporting; communicating said failure message to all said switching nodes in said network; and referencing updated routing tables at said switching nodes, wherein said network element indicated in said failure message is eliminated from routes in said network. Each of the switching nodes is included in a network tree spanning all said switching nodes in said network, wherein each of said switching nodes is included as a root in a specific network tree, each said network tree having a tree identification, said failure message further including a tree identification field containing said tree identification, and the method includes the step of routing said failure message in said switching nodes of said network based on said tree identification. The failure message includes a time stamp indicative of the time said failure message was generated, and the referencing of the updated routing tables is delayed a predetermined time period from the time of said time stamp before referencing said updated routing tables.

BRIEF DESCRIPTION OF THE FIGURES

For a better understanding of the present invention, reference may be had to the following description of exemplary embodiments thereof, considered in conjunction with the accompanying drawings, in which:

FIG. 1 shows a representation of a conventional wireless network architecture;

FIG. 2 shows a representation of an interworking between an ATM Wide Area Network (WAN) and a Wireless ATM Network (WATM);

FIG. 3 shows a representation of an Ad-Hoc Wireless LAN according to the present invention;

FIG. 6 shows an exemplary LAN configuration which illustrates the present invention Wireless ATM VP/VC concepts;

FIG. 8 shows an exemplary LAN configuration for illustration of the present invention Homing Algorithm routing scheme;

FIGS. 18A–18F shows an exemplary network having different nodes in the network as the root;

FIG. 19 shows an exemplary representation of a failure message encapsulated into an ATM cell;

FIG. 20A shows an exemplary hardware implementation for determining if a received message is a failure message;

DETAILED DESCRIPTION

The present invention is a restoration scheme for an ad-hoc ATM LAN wherein ATM cells are transported over a wireless point-to-point link and is described with respect to a LAN consisting of a network of nodes called Portable Bases Stations (PBSs) which provide microcell coverage. Referring to FIG. 3, there is shown exemplary representation of the LAN 20 which includes a plurality of interconnected PBSs 22. Although the interconnection between the PBSs can be either wired or wireless, the emphasis here is on wireless implementations, for example, radio or free-space optics.

Portable Base Station Architecture

An advantage of the Portable Base Station architecture is that the PBSs can employ an ad-hoc networking layout. That is, the PBSs can be distributed in an arbitrary topology to form a backbone network that can be reconfigured with relative ease. In FIG. 3 the PBS to PBS backbone links 24 are high speed, for example GB/s, for supporting high system capacity.

The user to PBS access links 26, on the other hand are primarily for mobile access (e.g., 2–20 Mb/s) and therefore are wireless. The mobiles 28 which may be comprised of laptops, notebooks, etc. utilize multiple access protocols that permit mobiles to share the user to PBS links, as will be discussed. Here it is also pointed out that mobiles 28 can communicate with one another directly as peer-to peer if they are near each other. Otherwise, they communicate by using the PBS backbone LAN.

As discussed, typical mobile endpoints are assumed to be laptops or notebook computers. Services supported include conventional data applications (e.g., over TCP/IP or SPX over ATM) as well as multimedia (video, voice and data) applications directly over an ATM Adaptation Layer (AAL) and ATM with a Quality of Service (QoS) specification. For TCP/IP networks, there exist approaches to mobility management at the network layer, e.g., Mobile IP. In the present invention network, the approach is similar, except mobility management and handoffs are handled at the ATM layer. Thus, the ATM layer becomes the networking layer and mobility management is extended to applications that are directly carried by AAL and ATM.

Figure 4:
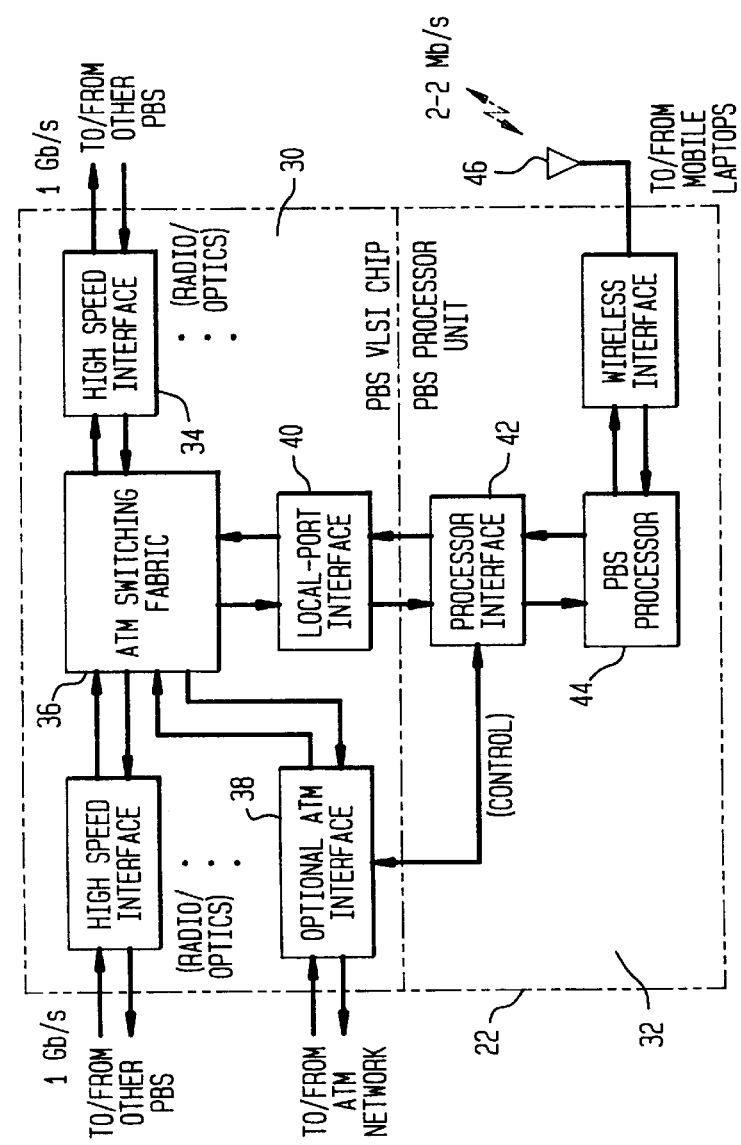
FIG. 4 shows one preferred embodiment of a PBS architecture according to the present invention.

Referring to FIG. 4, there is shown one preferred embodiment for a PBS architecture 22 according to the present invention. As shown, the PBS 22 is comprised of two main components, for example, a PBS VLSI chip 30 which contains all switching and interface functions and a PBS processor unit 32. The switching and interface functions of the PBS chip are included in a single chip so as to minimize power and space. The PBS processor unit 32 is basically a controller that can be implemented with single-chip designs as well.

As can be seen, the PBS chip 30 includes a plurality of high speed interfaces 34 for communicating with other PBSs. The high speed interfaces 34 transmit, for example, in the Gb/s range and as mentioned previously, may be hardwired, but are preferably coupled wirelessly using radio and/or optics. The high speed interfaces 34 are coupled to ATM switching fabric 36 which is responsible for the physical routing within the chip 30. Also coupled to the switching fabric is an optional ATM 38 interface which has connections to and from an ATM network. The ATM switching fabric 36 is coupled to the PBS processor unit 32 by means of a local port interface 40. The local port interface 40 is in turn coupled to a processor interface 42 which couples to the PBS processor 44. Signals to and from the mobile laptops are transmitted and received at an antenna 46 or other receive/transmit means where the signals travel at the Mb/s range. A wireless interface 48 couples the antenna 46 to the PBS processor 44. The processor interface 42 may also have a direct connection to the optional ATM interface 38 for control purposes. As will be understood, the PBS will also include memory, for example FIFO memory, for selectively storing ATM cells. The memory may store up to a predetermined number of cells and/or may store cells for only up to a given time unit.

Thus, the PBS network is made up of small, high speed ATM switches. It is an intention to employ off-the-shelf switch fabrics 36, with the addition of custom hardware and/or software in the PBS backbone network. This requires adhering to ATM standards as much as possible in the PBS backbone network.

Figure 5A:
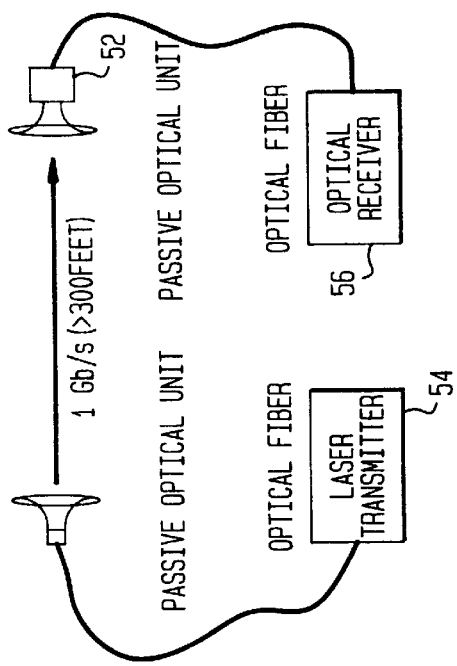
FIGS. 5A and 5B shows a one preferred embodiment of a free space optical link used with the present invention LAN.
Figure 5B:
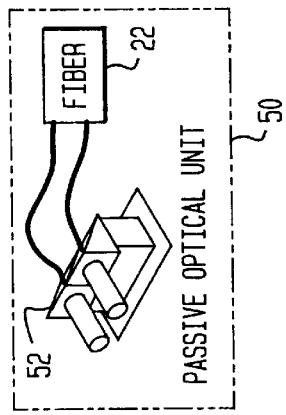

Referring to FIGS. 5A and 5B, there is shown one preferred embodiment of a free space optical link 50 used with the present invention LAN. The system employs 1 Gb/s frees-pace optical links for PBS to PBS communications and a 2 Mb/s radio operating at 900 MHz for user to PBS communications. A passive optical lens assembly 52 is used to launch and receive the optical beam so that the active components can be integrated into the PBS 22 itself. The passive optical unit 52 may be used in conjunction with a laser transmitter 54 and optical receiver 56.

An important aspect of the wireless networking scheme utilizing PBSs is that of user mobility. In addressing this issue, the following assumptions are made with regard to boundary conditions: (i) slow mobility, for example, walking speed, (ii) distributed control, and (iii) permitted movement through blind spots. A goal of the present invention PBS networking scheme is to keep the PBSs simple and low cost. To that end the traditional ATM VP/VC (virtual path/ virtual channel) has been modified so as to eliminate the need for any VP/VC translation in the high speed (Gb/s) portion of intermediate PBS switches. As a consequence, a "VPI" (virtual path identifier) in the present wireless LAN scheme corresponds to a particular destination PBS, rather than to a virtual path of base stations and links., where multiple VPIs can be assigned to each PBS.

Referring to FIG. 6, there is shown an exemplary LAN 60 comprised of PBSs labeled 1–9 and used to illustrate the wireless ATM VP/VC concepts of the present invention. Mobiles labeled X, Y and Z are shown associated with PBSs 2, 9 and 1, respectively. The concept of multiple VPI assignments to single PBSs is illustrated in FIG. 6, where VPI 9a and 9b are each assigned to PBS 9. In other words, all cells with VPI 9a and VPI 9b are routed to the destination PBS 9. Associated with each VPI (Destination ID) is a unique route through the network from each source, thus forming a tree with the destination as the root. To distinguish cells from different connections, each PBS controls the assignment of VCIs associated with VPIs that terminate at that PBS. For example, in FIG. 6, (VPI 9a; VCI 1) and (VPI 9b; VCI 2) denote X to Y mobile connections, and (VPI 9a; VCI 3) and (VPI 9b; VCI 3) denote Z to Y connections. The VCI is established by making an inquiry to the destination PBS using a signaling channel during ATM connection establishment.

In order to support mobility within the network, sequence numbers for ATM cells will be utilized in certain parts of the network. Note that sequence numbers are available in the payload of an ATM cell for AAL (ATM Adaptation Layer) 1 through ¾, but not for AAL 5. This means that part of the header field must be utilized for carrying sequence numbers. As the Generic Flow Control (GFC) field is not needed in the PBS backbone network, the GFC field is chosen to be used for carrying sequence numbers. This leaves a total of 3 bytes to carry the Destination ID and the VCI. These 3 bytes can be divided in any way to carry the destination ID and the VCI. At the expense of restricting the number of PBSs in a backbone network to 256, the Destination ID can be set to 1 byte. This has the advantage of adhering to the ATM UNI standard. However, as would be understood by one skilled in the art, better use of the 3 bytes may be possible with a "non-standard" division between Destination ID and VCI.

With the Destination ID set to 1 byte and VCI set to 2 bytes, an ATM network is created for the PBS backbone network where the Destination ID corresponds to the VPI. As far as the "microstructure" of the PBS operation is concerned, the operation in the PBS backbone network and an ATM network is the same, i.e., an output port is determined based on the input port and Destination ID, wherein in the above case, no change is made in the VPI/VCI field.

If the Destination ID field is larger than 1 byte, although operation is still the same, off-the-shelf ATM switch fabrics may not be used without changes to their VPI/VCI operation.

Another advantage of setting the Destination ID field to 1 byte is that a mobile can communicate with a node outside of the wireless LAN through a gateway PBS without the gateway needing to change anything in the VPI/VCI field of an ATM cell. The ATM signaling protocols allow a node connected to an ATM network to set the VPI/VCI fields for connections to and from the ATM network. With this simplification, functionality of a gateway PBS is highly reduced and potentially any PBS can be a gateway.

Figure 7:
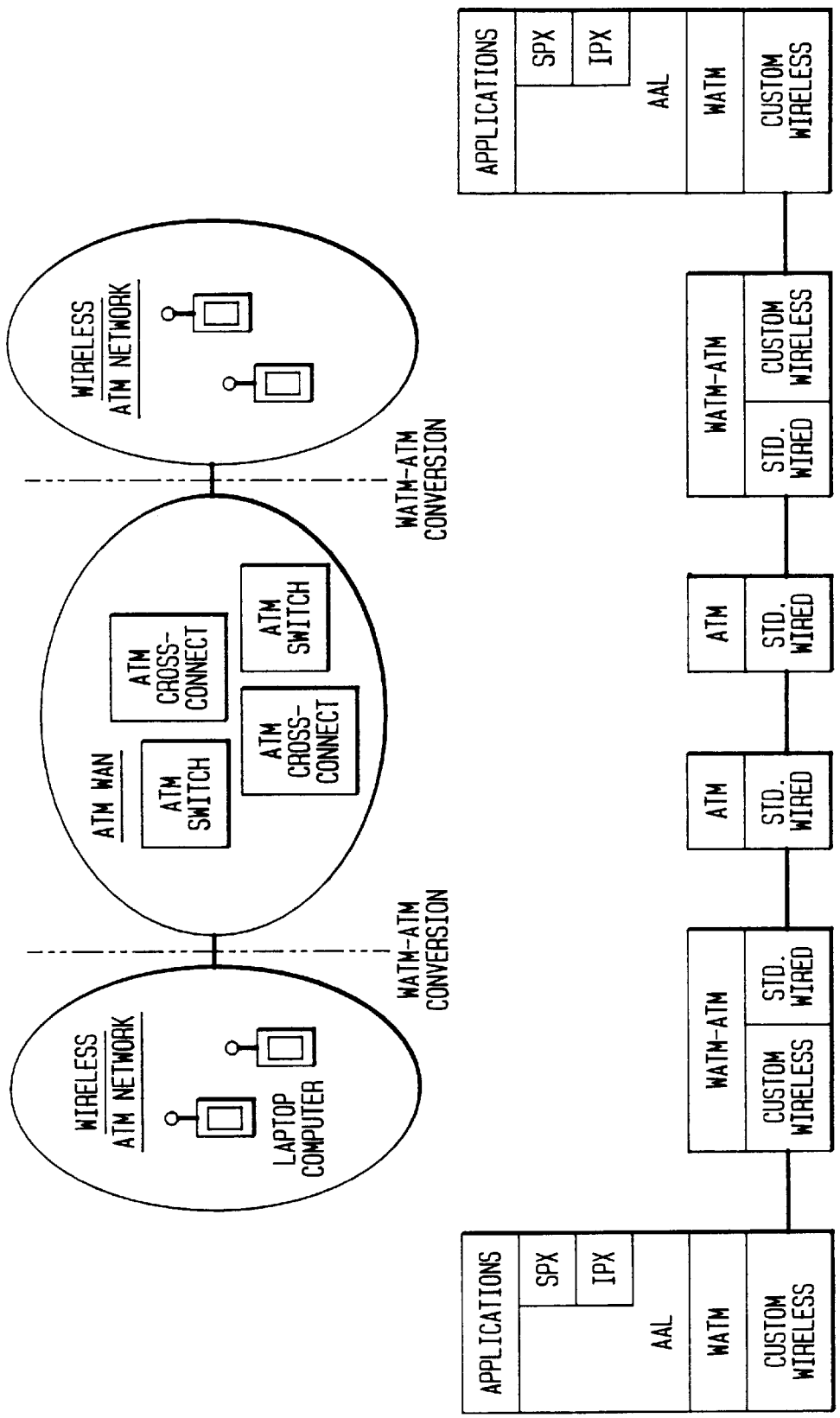
FIG. 7 shows a target protocol stack for the network signal flow illustrated in FIG. 2.

Referring to FIG. 7, a target protocol stack for the network is shown below the signal flow illustration discussed in FIG. 2. As can be seen, the target protocol stack is as follows, Wireless Mobile: Custom Wireless, WATM, AAL, IPX, SPX, Application; PBS-Mobile: Custom Wireless, WATM-ATM; PBS-PBS: High Speed Physical Layer, ATM; Wired User: High Speed Physical Layer, ATM, AAL, IPX, SPX, Application. In the protocol stack, "Custom Wireless" has a custom physical layer and a custom multiple access control. The custom physical layer has encapsulation of one or more ATM cells. This encapsulation has a FEC/CRC (forward error correction/cyclic redundancy checking), and may have additional cells for cell-level FEC.

Homing Algorithm Routing Scheme

In a mobile environment, handoffs between base stations is straightforward when the traffic is circuit switched with matched source/sink data rates. In contrast, when the traffic is packet-switched with source data rates much greater than sink data rates (e.g. many more sources simultaneously transmitting packets to a common destination), there are many more challenges. For example, if ATM cells were always routed to a mobile's current position, then many cells for a given mobile may end up queued at other base stations (where the mobile previously was positioned). It would then be necessary to retrieve those cells from those multiple distributed queues and deliver them to a mobile in a proper FIFO sequence.

The present invention uses a routing scheme or Homing Algorithm for routing ATM cells in the wireless mobile network which preserves the proper FIFO sequence, and which allows users to move about the network and continue communications perhaps even during the middle of an active session or conversation. Referring to FIG. 8, there is shown an exemplary network configuration in which boxes labeled 1–8 represent PBSs 22 (ATM packet switches), and circles A and B denote (two) mobile users 28 that are communicating with each other. A' and B' denote the locations of A and B at a later time. A and B have wireless connections to the network (specifically at PBSs 2 and 7, respectively) and the high speed links between PBSs can be either wired or wireless. The term "Local PBS" is used when referring to a PBS associated with a mobile's current position.

In order to maintain reliable, in-sequence ATM transmissions as users move during the course of a connection, a "Source Home Station" and "Destination Home Station" are utilized. These Stations refer to particular PBSs, associated with a connection, that play a pivotal role in maintaining cell sequence. ATM cells from user A that are destined to user B are first routed from A to the Home PBS for A. The cells are then routed along a predetermined virtual path from the Source Home PBS to the Destination Home PBS, where they are buffered and then delivered in-sequence to B's Local PBS.

Referring to FIG. 8, a virtual path from PBS 2 to 7 (passing through 4 and 6) transports ATM cells from A to B.

That is, PBS 2 is the Local PBS for A and also the Source Home PBS for the A to B connection. Likewise, PBS 7 is the Local PBS for B and also the Destination Home for the A to B connection. When A moves to location A' (with a wireless connection to its new Local PBS 3), the ATM cells are first routed along a predetermined path from PBS 3 back to the Home PBS 2, and then along the virtual path from 2 to 7. If B has also moved, for example, to B', then B's Home PBS 7 will forward the ATM cells to B's Local PBS 8, which is its current position, again using a predetermined path.

The advantages of the present Homing Algorithm Routing Scheme include simple control and preservation of the FIFO cell sequence within a VC and between VCs with common endpoints. The implementation allows the preservation of the FIFO cell sequence without a centralized controller and without resequencing at the destination. In the described example, cells obviously preserve their FIFO sequence as they traverse the virtual path from 2 to 7. Thus, the routing scheme need only maintain "local cell sequence" as cells flow to/from the Home PBS as the handoff occurs from one base station to the next.

There is some inefficiency associated with always routing cells to/from Home Stations. Accordingly, to improve network efficiency, the locations of the Home PBSs are "slowly" updated as users move through the network. For example, after A moves to A', PBS 3 can be redefined to be the new Source Home with, for example, a path through PBS 5 to reach the Destination Home PBS 7.

The following addresses procedures for establishing the updating of Source Home Local PBSs and Destination Home and Local PBSs. When a mobile moves from a first Local PBS $S_1$ to a second Local PBS $S_2$, the mobile sends a signaling request (through $S_2$) to its Source Home $S_H$—using the signaling VCI (5). Provided there is bandwidth available to keep the connection established from the new location $S_2$, $S_H$ responds through $S_2$ to the mobile with a new VPI and VCI. In addition, $S_H$ also notifies the mobile of the sequence number of the last ATM cell it received from that connection. This is needed to deal with the problem that ATM cells transmitted while the mobile was at $S_1$ may not have reached $S_H$ yet. Note that this requires $S_H$ to record the sequence numbers of each cell for the active VCs "destined to it" (and therefore is done on the low-speed side of the PBS). If the last sequence number received at $S_H$ is not equal to the last sequence number transmitted by the mobile, then the mobile retransmits the appropriate cells. Meanwhile, $S_H$ deletes the old VPI/VCI entry and any remaining cells transmitted while the mobile was at SI will be dropped when they reach $S_H$.

If it is desired for this connection to update the Source Home from $S_H$ to the Local PBS $S_2$, a similar procedure is used, except that the signaling request is sent to the destination Home $D_H$, which then responds (if bandwidth is available) with the VPI, VCI, and the last-received sequence number.

As an alternative to the above-described updating procedure, Source forwarding and Source-Home updates may be accomplished in another manner. When a mobile moves from Local PBS $S_1$ to Local PBS $S_2$, the mobile sends a signaling request (through $S_2$ and $S_1$) to its Source Home $S_H$. Provided there is bandwidth available to keep the connection established from the new location $S_2$, $S_2$ responds to the mobile with a new VPI and VCI. Cells transmitted from $S_2$ using the new VPI and VCI are delayed (in a small FIFO) at $D_H$ until all cells arrive from $S_H$. A special "Tail" Signal sent from $S_1$ to $S_H$ indicates the old path is clear, and also indicates that the old VPI/VCI entry should be deleted.

If it is desired to update the Source Home (for this connection) from $S_H$ to the Local PBS $S_2$, a similar procedure is used, except that the signaling request is sent from $S_H$ to the Destination Home $D_H$, which then responds (if bandwidth is available) with the new VPI and VCI. Cells transmitted directly from the new Source Home $S_2$ will be delayed (in a small FIFO) at $D_H$ until all cells have arrived from $S_H$ (the previous Source Home) which is indicated by the arrival of the "Tail" signal.

When a mobile moves from Local PBS $D_1$ to Local PBS $D_2$, (Destination Forwarding) the mobile sends a signaling request (through $D_2$) to its Destination Home $D_H$. Since $D_2$ has knowledge of the network topology and it also controls the assignment of VCIs for connections destined to itself, it includes in the message to $D_H$ the new VPI and VCI. In addition, the mobile informs $D_H$ of the sequence number of the last received cell. If the last sequence number transmitted from $D_H$ doesn't match the last sequence number received by the mobile, then $D_H$ retransmits the appropriate ATM cells to $D_2$—using the new VPI and VCI. Note that this requires the PBS to have a low-rate "Forwarding Queue" that stores the last "N" ATM cells it forwarded for each connection. In addition, there is need for VPI/VCI translation for forwarding cells.

If it is desired for this connection to update the Destination Home from $D_H$ to the Local PBS $D_2$, a similar procedure is used, except that the signaling request is sent to the Source Home $S_H$ which then (if bandwidth is available to allow the update) transmits future cells directly to $D_2$. The mobile then uses a single FIFO buffer to delay (if necessary) the cells transmitted to the new Destination Home PBS ($D_2$) until all cells have arrived from $D_H$.

Note that Home PBSs are associated with connections, and not necessarily with mobiles. For instance the Source Home in FIG. 8 for the connection from A' to B may be different than the Source Home for a connection from A' to C. Typically, all connections originating from a mobile will have the same Source Home and all connections destined to a mobile will have the same Destination Home. However, because Home stations can be updated as mobiles move about the network, various connections may temporarily have different Homes.

Finally, for "forwarding cells", note that VPI/VCI translation is required only at the Source Home $S_H$ (if the source is not located at $S_H$) and the Destination Home (if the destination is not located at $D_H$).

Control and Management

In this section, certain control and management functions are considered, i.e., network management, mobility management, and connection control. Network management algorithms are designed to configure data tables that are used by connection control algorithms. These data tables change due to network upgrades and faults/restorals. Two aspects of mobility management are considered: (i) registrations, to handle mobile sign-ons, and idle handoffs, i.e., handoffs that occur when a mobile unit is powered on, but not in a connection; and (ii) mobile location procedures during connection setup. Finally, connection control procedures are described to set up and release connections on-demand. This includes managing available resources, such as link bandwidth and VCIs. Since the present inventions LAN is targeted for use with multimedia end-units, to ensure guaranteed jitter bounds for voice and video (isochronous) traffic, schemes are adopted where Quality-of-Service (QoS) guarantees are provided during connection admission. For applications that do not require such QoS guarantees, simplified connection control schemes can be applied by omitting the QoS checking phase.

Some of the signaling messages, needed to support the connection control and mobility management procedures, are sent on out-of-band signaling channels, i.e., the standard signaling VCI (VCI 5) on all VPIs. Other messages are exchanged on inband signaling channels (using the same VCI as the user information, with the Payload Type (PT) field distinguishing signaling data from user traffic), or on dedicated VCIs.

Figure 9:
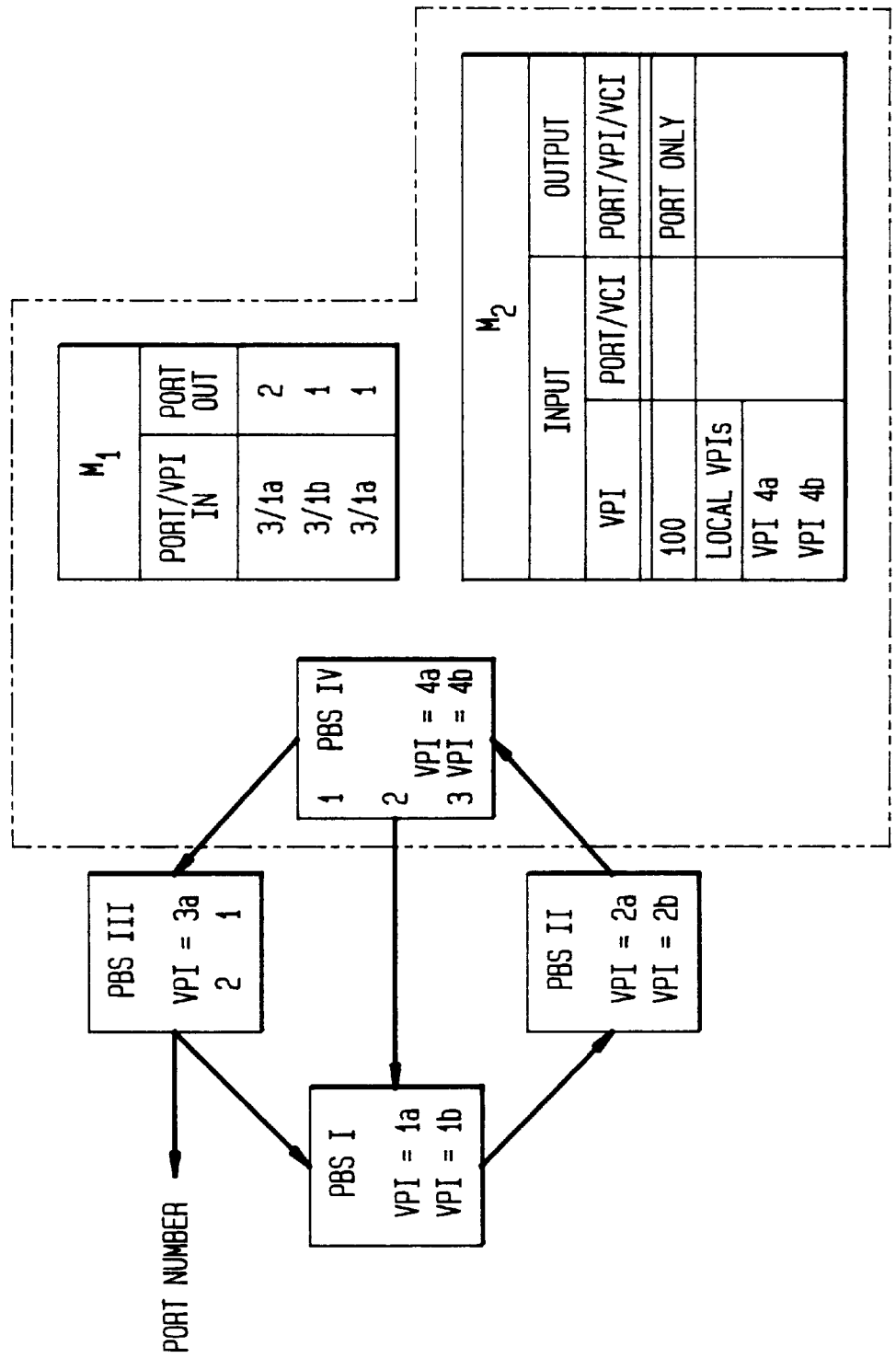
FIG. 9 shows a portion of the network administered tables for use in the present invention PBS network.

In order to administer the per PBS VPI allocations described in FIG. 6 VPI routing tables are needed to be set up in the PBSs as shown in FIG. 9. The VPIs allocated to each PBS are shown in italics within boxes marked with the PBS identifiers (numbers I–IV). Within the present system, it will be understood that VPI 0 is reserved for mobile-to-mobile communication. Each PBS stores the VPI routing Table $M_1$, which is a mapping of an incoming VPI on any port to an outgoing Port. In FIG. 9, a part of this table is shown for PBS IV. In setting up Table $M_1$, a unique path from any source to any destination PBS is ensured for a given VPI. The algorithms for configuring and maintaining these tables can be executed in a centralized or distributed manner.

In addition, VPI 100 is assigned as a broadcast VPI used by all the PBSs for mobile location prior to connection establishment. Using shortest path algorithms, such as Dijkstra's or Bellman-Ford, a tree is set up from each PBS to all other PBSs. Different VCIs are used to distinguish the trees originating from different PBSs all of which use VPI 100. Table $M_2$, as shown in FIG. 9, is needed to map/translate VCIs only for VPI 100 and other local VPIs. The table entries corresponding to VPI 100 only map input port and VCI to an output port without changing the VCIs. For data received on local VPIs, both VPI and VCI may be translated. To maintain the ad-hoc nature of this network, the number of network management administered tables that are required in each PBS has been minimized while designing control procedures.

Next, procedures are described for two aspects of mobility management: registrations (for power-up, power-down, and idle handoffs) and mobile location. Three options are considered for mobile registration and location. In Option I, each mobile registers on power-up and power-down, as well as when it moves to a new PBS. Each PBS broadcasts its identifying beacon which allows the mobile to determine that it has entered the domain of a new PBS. When a PBS receives a registration message, it broadcasts the mobile's presence to all the other PBSs in the LAN. Thus, if a connection is requested to this mobile, the Local PBS of the calling mobile knows the location of the called mobile immediately. A connection can be set up from itself to the Local PBS of the called mobile.

In Option II, each mobile registers on power-up, power-down, and on changing PBSs, but the PBS, upon receiving a registration message, does not broadcast the presence of the mobile to the other PBSs. Thus, when a connection is requested to a mobile, the Local PBS of the calling mobile does not know the current location of the called mobile or even if it is powered-on. A page is required to find the Local PBS of the called mobile.

In Option III, a mobile does not register at all. In this case, when a connection request is made, the Local PBS of the calling mobile must initiate a page to all the PBSs. Each PBS, in turn, must initiate a page to determine if the called mobile is listening to its beacon.

In a preferred embodiment of the invention, Option II is selected for the PBS LAN. This selection is based on the trade-off between the excessive connection setup time needed in Option III vs. the excessive number of messages needed to track the mobile in Option I. Thus, our mobile location algorithm or method consists of using broadcast pages to locate the Local PBS of the called mobile.

Idle handoffs occur when a powered mobile, that is not part of a connection, moves from one PBS to the next. Registration messages are sent by a mobile whenever it identifies a new PBS. The beacon transmitted by the PBS includes as a parameter one of its assigned VPIs, thus enabling the mobile to recognize the presence of a new PBS. Assuming that the strength of the signal from the mobile to the old PBS may be weak, instead of requiring the mobile to de-register with the old PBS, the new PBS sends a De-registration message to the old PBS.

The procedure for mobile location prior to connection establishment is now described. As can be understood, the process of requiring a mobile to register upon powering-up allows the PBS-based network to set up incoming connections to the mobile. Upon receiving an incoming message from a mobile, the Local PBS simply makes a record of the mobile. It does not register the mobile's presence in any location database, as is done in current cellular networks, nor does it broadcast the presence of the mobile to the other PBSs. Thus, when a connection is requested to a mobile, the Local PBS of the calling mobile does not know the current location of the called mobile or even if it is powered-on. A broadcast page is generated by the Local PBS of the calling mobile to find the Local PBS of the called mobile. If the called mobile is registered on one of the PBSs in the network, this PBS responds to the broadcast page and connection establishment between the two Local PBSs of the calling and called users proceeds. If the mobile is not registered at any of the PBSs in the network, the Local PBS of the calling mobile that generated the broadcast page times-out and rejects the call request.

We do not employ any location servers or registers in order to keep the network simple. As we are primarily focused on a LAN, when a mobile generates a request for connections to another mobile, the Local PBS of the calling mobile merely performs a broadcast to determine the PBS at which the called mobile is registered. The called mobile's Local PBS responds, allowing for the connection setup between the two PBSs to proceed. For mobile-to-fixed-endpoint (server or user) connections, a PBS may store the identity of the PBS to which the fixed endpoint is connected or may determine the location each time by the broadcast-search process.

Connection control is now described, wherein it is shown how connections are set up in this LAN while supporting the new Wireless ATM VP/VC concept. All the scenarios discussed are for two-party connections. Extensions of these procedures for multi-party connections and third-party connection control may also be derived.

The steps involved in setting up on-demand connections in any ATM network consist of:
1. Finding a route between the endpoints of the connection,
2. Checking the availability of bandwidth and other QoS measures, if any,
3. Selecting VCIs at each link on the end-to-end connection, and
4. Setting up VP/VC and port-translation tables.

In the present invention LAN, step 1 is not required for each on-demand connection. By using destination-based VPI addressing, the routes are predetermined by the mapping tables $M_1$ at each PBS as previously described. In step 2, the availability of bandwidth and other QoS measures are checked at each transit PBS on the route between the Local PBSs of the calling and called mobiles. The selection of VCIs in step 3, and the setting up of translations in step 4 (mapping table $M_2$), need to be performed only at the two Local PBSs. Before performing steps 2,3, and 4 to establish a connection, a procedure is needed to locate the called mobile since this ATM LAN is primarily used to interconnect mobiles.

Figure 10:
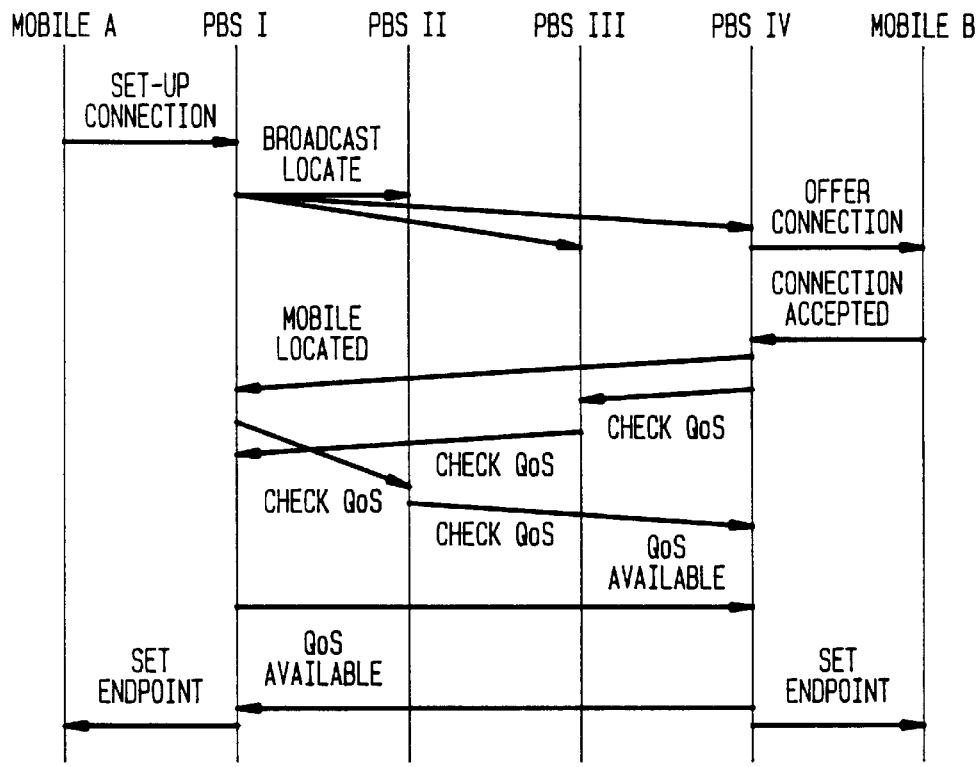
FIG. 10 shows a connection establishment procedure for the present invention wireless ATM LAN.
Figure 11:
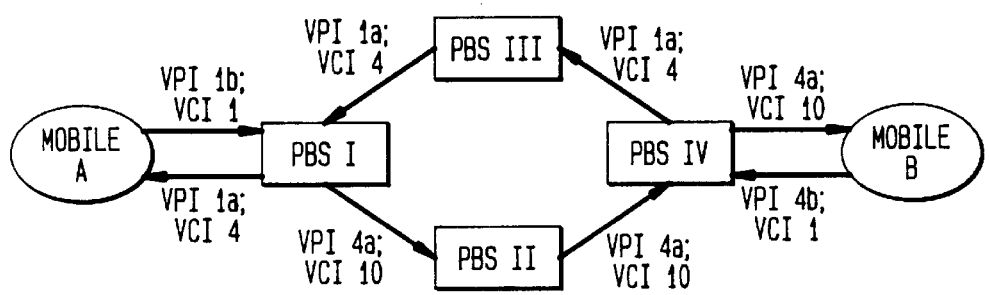
FIG. 11 shows an exemplary LAN configuration and assignment for the connection establishment of FIG. 12.

The procedure for locating the called mobile, selecting VCIs, checking the availability of the requested QoS, and setting up translations is explained by example. Referring to FIG. 10, a bi-directional connection setup initiated by mobile A to mobile B is illustrated. As can be seen, mobile A generates a Setup-connection message with parameters identifying the two mobiles and QoS measures, if any. The Local PBS of mobile A, which is PBS I in FIG. 10, generates a broadcast message, on VPI 100 and its assigned VCI, in order to locate the called mobile's Local PBS. In this message, besides the called mobile's address, it assigns one of its VPIs (VPI 1a) with a VCI (VCI 4) for the backward connection, i.e. from the called mobile's Local PBS to itself, as shown in FIG. 11. Assuming the called mobile B is located on PBS IV, this PBS offers the connection to mobile B. This step is needed to alert the called mobile before actually setting up the connection. If this is accepted, PBS IV responds to PBS I with a Mobile-located message in which it assigns a VPI (VPI 4a) and VCI (VCI 10) for the forward connection from PBS I to PBS IV. FIG. 11 shows that the selected VPIs for the two directions of the connection may follow different routes, i.e. pass through different intermediate PBSs. The destination PBS for each connection is assumed to manage the VCIs incoming on its VPIs. If the called mobile (mobile B) rejects the connection offer, a Connection-rejected message is sent from PBS IV to PBS I, and subsequently to the calling mobile (mobile A).

Referring to FIG. 11 in connection with FIG. 10, it can be seen that next, both PBS I and PBS IV send the Check-QoS message in opposite directions to check for the availability of the QoS measures requested on the routes followed by VPI 4a and VPI 1a, respectively. The Check-QoS messages are sent in a hop-by-hop manner through all the PBSs in the path between the two Local PBSs for the assigned VPIs. Unlike B-ISDN signaling standards for ATM switches, inband signaling is used in this LAN to carry this Check-QoS message. Upon receiving this message, each transit PBS, such as PBS III, determines if the requested QoS measures are available. For example, if average bandwidth is one of the QoS measures specified, PBS III would check for the availability of the requested bandwidth on its outgoing port for the VPI being traced. If the requested QoS measures are available, the transit PBS passes on the in-band signaling message Check-QoS to the next PBS on the route for the VPI on which the message arrived, after reserving the required QoS measures for the given connection. The two PBSs (PBS I and PBS IV) exchange QoS-available messages upon the successful reception of the Check-QoS messages. Although the QoS parameters supported in this network have not been explicitly stated, depending on the implementation, these could include peak and average bandwidth, delay, jitter, etc.

In-band signaling implies using the VPI and VCI of the assigned connection with the payload type (PT) field indicating a signaling cell. For example, the Check-QoS message from PBS IV to PBS I is sent on VPI 1a, VCI 4 with the PT field set to indicate signaling. Parameters of this message are defined such that the whole message does not require more than one ATM cell. This eliminates the need for a signaling AAL and speeds up the processing of this message at each transit PBS. Using the VPI/VCI of the assigned connection, with the payload-type in the ATM cell header set to indicate signaling, the message is passed through the set of transit switches on the assigned VPI. Each PBS checks for availability of the specified QoS measures, and passes the message to the next PBS on the VP tree. By using in-band signaling, we reduce protocol layer processing at each transit PBS. It also implies that additional data tables are not required at the PBSs for routing signaling messages. For example, if the Check-QoS message is sent out-of-band, then the message from one transit node to the next needs to be sent on the signaling VCI of a VPI assigned to the receiving transit PBS. This PBS then needs to consult a data table to determine a VPI for the next transit PBS that is on the route of the VPI for the connection being traced. Thus, with a hybrid out-of-band and in-band signaling scheme, connection control and mobility management procedures can be supported with minimal data tables.

Figure 12:
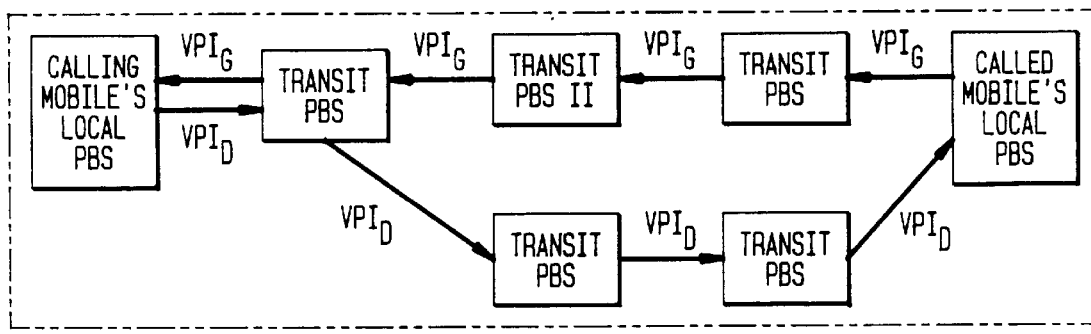
FIG. 12 shows an exemplary routing configuration through the present invention LAN.

As in FIG. 11, it is likely that in our LAN the set of transit switches in the two directions may be different because VPI trees may not be pre-configured with symmetric routes. Another example of this case is shown in FIG. 12. This implies that QoS checking must be done separately in the two directions. In the present invention LAN, we have the advantage that the two Local PBSs are determined before connection establishment. For connection requests to mobiles, this determination is made by both Local PBSs during the broadcast-location phase. For connection requests to fixed endpoints, the calling party's Local PBS may determine the far-end Local PBS simply from the called party's address. It then communicates its own identity and the need for a connection establishment to the far-end Local PBS. This feature allows the QoS checking process to proceed in both directions simultaneously.

At this point, still referring to FIGS. 10 and 11, the two Local PBSs send the Set-endpoint messages communicating the VPI/VCI pair for the forward and backward connections to the two end-mobiles. Each Local PBS reuses the VPI/VCI incoming to itself from the far-end Local PBS on the air interface link. But, for the opposite direction, it assigns a VPI/VCI corresponding to one of its own VPIs. For example, PBS I reuses VPI 1a, VCI 4 for its downward link to the mobile, but picks a VPI/VCI (VPI 1b, VCI 1) terminating on itself for the upward link.

If a PBS in transit finds that it cannot allocate the requested QoS, it sends a QoS-unavailable message on the signaling channel (VCI 5) of the VPI being traced. This message directly reaches the end PBS without any processing in the intermediate nodes. In this case, this PBS (being one of the two Local PBS 6) sends a QoS-unavailable message to the other Local PBS. The connection is rejected to the requesting mobile by its Local PBS and the VCIs and any reserved QoS measures are released.

In order to speed-up the end-to-end connection setup process, each transit PBS can send the Check-QoS forward to the next PBS while it performs its own processing. To support this, separate positive (and negative) messages need to be generated by each transit PBS to the end Local PBS to confirm QoS availability. The increased messaging needs to be traded-off against the gain in end-to-end connection setup delay for specific network designs.

Figure 13:
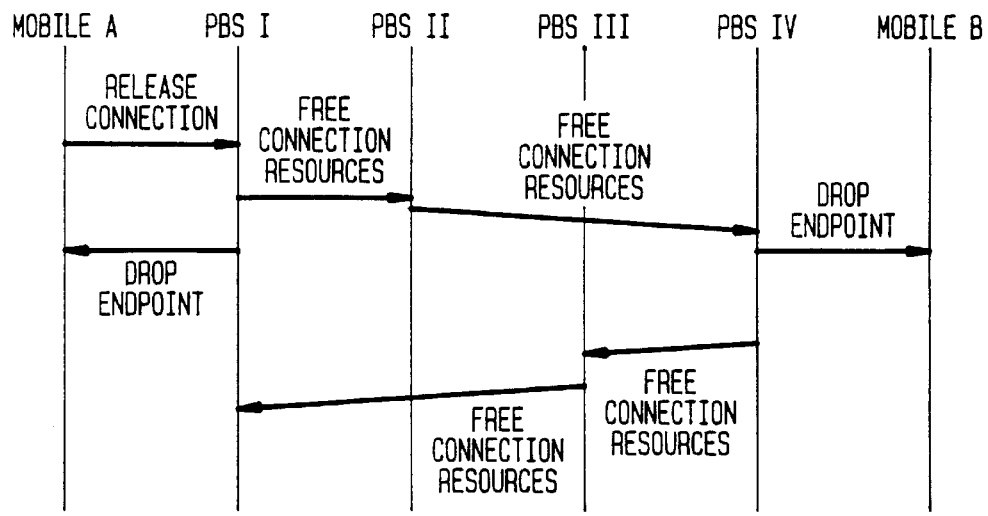
FIG. 13 shows a connection release procedure for the wireless ATM LAN.

The procedure used to release connections is shown in FIG. 13. It can be initiated by either of the mobiles A or B in the connection with a Release-connection message. The Local PBS of the release-initiating mobile sends a Free-connection-resources message. It also sends a Drop-endpoint message back to the mobile. The far-end PBS (PBS IV) sends a Drop-endpoint message to its mobile and generates a Free-connection-resources message to the first transit PBS in the route along the backward connection. The transit PBSs (PBS II and PBS III) release the resources that they had reserved on the two routes (VPI 1a and VPI 4a). These messages are routed inband on the VP in VCIs being released.

An alternative method to set up fast connections with QoS guarantees is described in the following paragraphs. Each PBS stores the routes from any source PBS to itself for each of its designated VPIs. Link and node resources are pre-divided among all the PBSs. Thus, a PBS while assigning VCIs for incoming on-demand connections, checks resource availability on all the links and nodes in the route from the source PBS to itself for the given VPI selected. Connection setup time is lower using this approach when compared to the approach presented earlier, since the hop-by-hop Check-QoS procedure is no longer needed. For example, in FIG. 11, resource availability on all the links and nodes constituting the route from PBS I to PBS IV is checked at PBS IV and on the route from PBS IV to PBS I at PBS I. Drawbacks of this approach include a reduction in network scalability and a reduction in statistical multiplexing gains. Hybrid schemes combining the two approaches can also be considered for large networks.

To support the approach described earlier with respect to FIG. 11, a simple data table $M_3$ is needed at each PBS to track its own resources, such as bandwidth on its ports. For each on-demand connection that is established across a PBS, the PBS determines if it has sufficient resources to meet the QoS requirements of the connection. To support the alternative approach presented here, we need two mapping tables in each PBS X, these tables are:

$M_3$: Destination VPI+Source PBS ID→a route of PBSs; for all VPIs assigned to the PBS X and where the route is specified using a sequence of PBS IDs and port numbers on the PBSs; and $M_4$: link/node→allocated resource; for all links and nodes in the network.

Maintaining these additional tables, however, is difficult in an ad-hoc network. Thus, it may necessitate the need for a system administrator while upgrading the network, i.e., when a PBS is added or removed.

Figure 14:
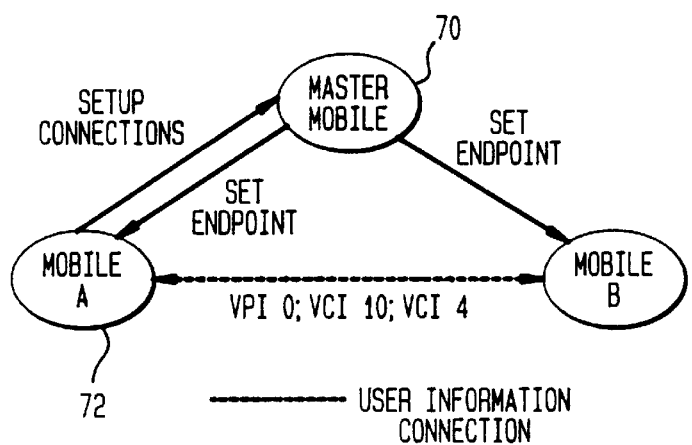
FIG. 14 illustrates a mobile to mobile connection without PBS involvement.

As described previously, the present invention PBS network allows mobiles outside the range of the PBS network to communicate directly with each other. When a mobile powers-on, it checks to see if it can pick up a transmitting beacon of some other mobile or a PBS. If no such mobile or PBS exists, it starts transmitting its own beacon, and thus becomes a master 70 as shown in FIG. 14. When a second mobile 72 listens to this beacon, it can request connections to other mobiles as shown in FIG. 14. The master mobile 70 allocates VCIs for the two channels in a bi-directional connection using Set-endpoint messages. It is assumed that VPI 0 is used for mobile-to-mobile connections, as described earlier. Such connections are handled in small disjoint mobile-controlled groups outside the scope of the PBS network.

Figure 15:
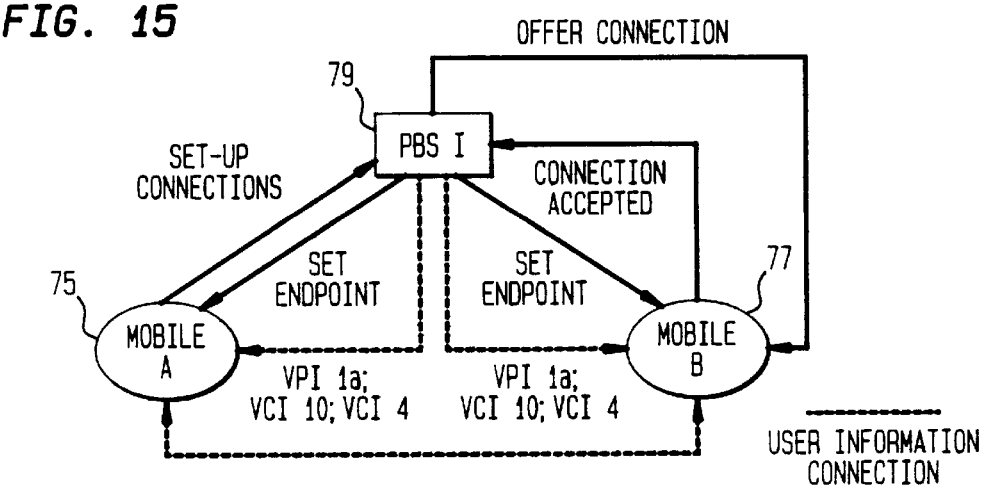
FIG. 15 illustrates connection establishment between mobiles on the same PBS.

A distinction needs to be drawn between the case discussed above and one in which a PBS is present with both mobiles on the connection being located on the same PBS. In the latter case, the procedure discussed using FIG. 10 applies. In FIG. 15, there is shown a mobile 75 (mobile A) originating a call to another mobile 77 (mobile B) that is also in the domain of the same PBS 79. The message exchange consists of Setup-connection, Offer-connection, Connection-accepted, and Set-endpoint, for connection establishment, and Release-connection, and Drop-endpoint, for connection release. The cross-PBS mobile location and QoS checking procedures are not required in this scenario. The user information connection may be routed through the PBS or directly between the two mobiles, as shown in FIG. 15, depending on whether or not the two mobiles are within listening distance of each other. In FIG. 15, the bi-directional user connection is within the control of PBS I, and hence uses one of its VPIs, VPI 1a.

Figure 16:
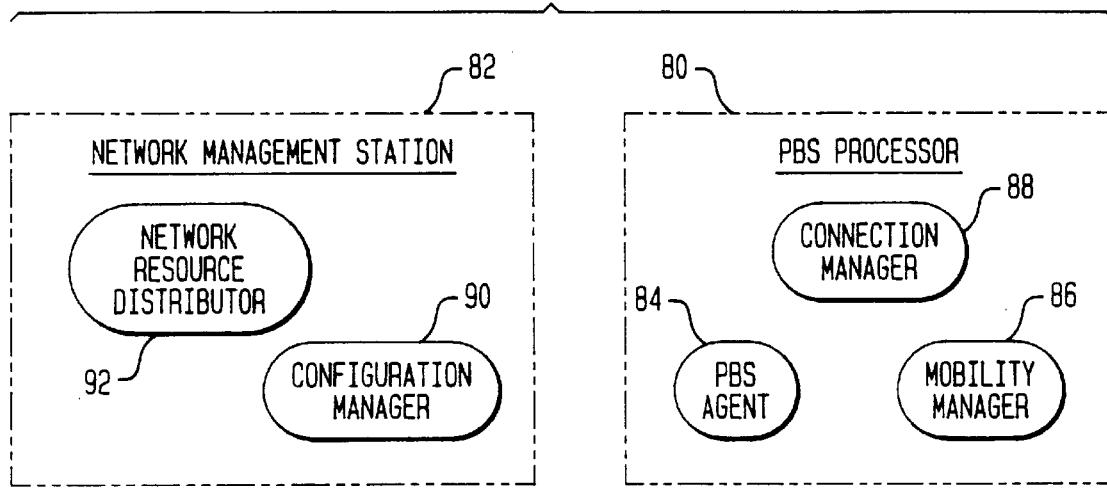
FIG. 16 shows a software architecture for PBS and network management station.

The layout of the networking software needed for control and management in the PBSs and network management stations is shown in FIG. 16. Each block shown within the PBS processor 80 and network management station 82 in FIG. 16 represents a software functional entity. Each entity can be implemented as a single process or a collection of processes. The PBS Agent 84 in each PBS tracks free and allocated VCIs on all the VPIs assigned to the PBS. In addition, it also manages resources, such as link bandwidth, for the PBS. The Mobility Manager 86 processes registrations, generates/responds to broadcast location messages, and manages handoffs. The Connection Manager 88 is needed only in the alternative connection establishment approach described above. It checks resource availability on the route taken from a source PBS to a given destination on any of its VPIs during on-demand connection establishment for connections that require QoS guarantees.

The software entities on each network management station 82 include a Configuration Manager 90 and a Network Resource Distributor 92. The configuration manager 90 sets up the mapping tables, $M_1$, and part of $M_2$, (for VPI 100), as defined with respect to FIG. 9, and handles the addition and deletion of PBSs, allowing the LAN to grow in an ad-hoc manner. The configuration manager 90 may also be implemented in a distributed manner at each PBS, depending on the processing and memory capabilities available in the PBSs. In this case, a network may be constructed with only PBS elements, i.e., without any network management stations. The network resource distributor 92 pre-assigns resources of each node and link in the network to all PBSs, i.e., sets-up tables $M_3$ and $M_4$ described in the alternative connection establishment procedure. The exact number of network management stations needed is dependent on the traffic and configuration of the PBS LAN. Distributed algorithms for these functions may be implemented across multiple network management stations that are connected to one or more PBSs. This modularized software architecture allows a network to be constructed using only the PBS agent, mobility manager and configuration manager modules. Such a network would only support the connection establishment procedure described in FIG. 13. To offer connection services with improved setup delays, the network resource distributor and connection manager modules are needed. These can be added at an additional cost.

Network Reliability

When considering the reliability of the present wireless LAN, issues can be divided into two categories, the reliability of the PBS backbone network and the reliability of the air link connecting the PBS to a mobile station. In the PBS backbone network, the sources of failures are component (transmitter, receiver, or whole PBS) failures, occasional link failures (due to obstruction of the radio or optical signal, or fiber or cable cuts in the cases of fiber and cable transmission), and software failures that may affect a group of PBSs. With transmissions over the air link, errors result from the multipath and noise problems, which should be combated with a good design at lower layers, in particular, the physical layer and the data link layer.

The division of data transmission into one or more Mb/s unreliable wireless access links and the Gb/s reliable backbone links for this wireless LAN facilitates the division of the reliability problem into the above two subproblems. Restoration and reliable transmission methods developed for the ATM networks, however, do not automatically carry over to this network.

This is because the PBS backbone network has ATM cells in transport, and is similar to an ATM network, except, as opposed to a regular ATM network, destination routing is used. ATM restoration algorithms that employ rerouting or splitting of routes simply by changing addresses in cell headers do not automatically apply, and different restoration techniques or different implementations of existing restoration techniques of ATM networks need to be developed.

Additionally, the air interface carries packets made up of one or more ATM cells. The basic design philosophy in ATM, an extremely reliable underlying network, is violated over the air. Therefore, the argument that an ATM network should support end-to-end error control does not carry over to this wireless LAN, although it has a transport mechanism similar to ATM. Error control is best accomplished at the air-PBS network boundary for two reasons. First, in the presence of a wireless-to-wireless connection with the PBS backbone network in between, the end-to-end error control becomes extremely difficult due to the possibility of loss of messages and acknowledgments in two separate unreliable links (the same argument applies to flow control). Repetition or redundant transmission of packets over a reliable air link due to an unreliable counterpart at the other end does not make sense since the bandwidth over the air is an expensive resource. Secondly, once the cells are inside the PBS backbone network, they are transmitted over highly reliable links, and link-by-link error control then becomes meaningless (again, the same argument applies to flow control).

Also, to keep the PBSs as simple and inexpensive as possible, complex restoration algorithms cannot be employed in the PBS backbone network. This wireless network represents a different paradigm than the cellular networks in existence today, which can support complicated base station equipment. In such networks, typically, mobiles have smaller processing power. Protocols have been designed to exploit this asymmetry and move the complexity of operation into the base station. The instant goal, however, is to design as simple PBSs as possible for economical reasons as well as for reasons of scalability to larger networks. Therefore, transmission protocols such as AirMail, where the base station does most of the processing, are not appropriate. In fact, since the asymmetry is reversed with respect to cellular networks, if an asymmetric protocol is to be employed, it should be the mobile that does most of the processing.

A. Network Restoration

Restoration issues in modern LAN, MAN, or WAN networks are considered highly important, and are usually addressed from the onset. For example, FDDI has dual rings which are configurable into a single ring in the case of link failure. Node failures are addressed by bypass options at the MAC layer. The IEEE MAN standard 802.6 addresses restoration similarly, and has provisions for reconfiguration into slot generation stations for any network node in the case of link failure. ATM restoration issues are being standardized by means of OA&M signal hierarchies known as flows, and alarm and notification signals known as AIS (Alarm Indication Signal) and FERF (Far-End Receiver Failure) at different levels of the flow hierarchy.

The principal routing technique in this network between PBSs, however, is destination routing which presents a distinct variation from the above. Accordingly, for every destination node, a tree (or possibly a family of trees) is generated that connects all PBSs. The cells carry destination addresses at their headers, and routing decisions at each PBS are made based on the header address. The decision involves a simple look-up from a local routing table that maps each header to an output port. During network booting, the look-up tables are generated by a routing algorithm. Various centralized or distributed algorithms can be employed for this purpose, such as the Bellman-Ford algorithm, or the minimum spanning tree algorithm. In considering the problem of restoration, a primary interest is in the updates to the routing tables at each PBS in the case of a failure.

Figure 17A:
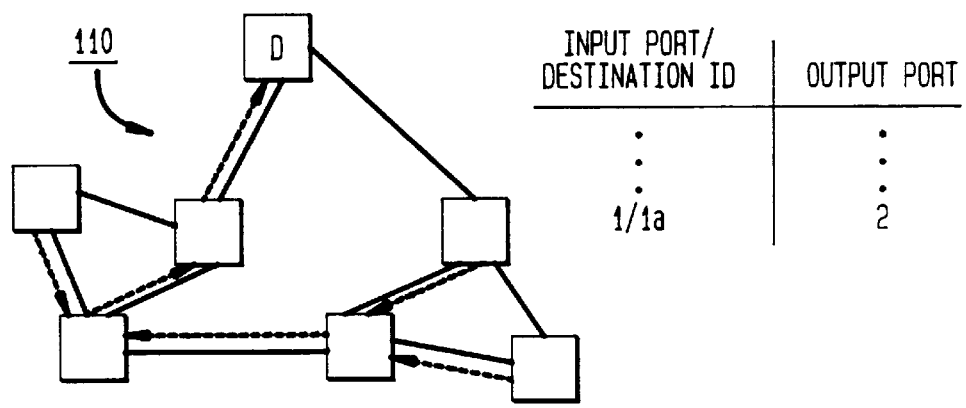
FIG. 17A shows an exemplary network tree and an associated routing table.
Figure 17B:
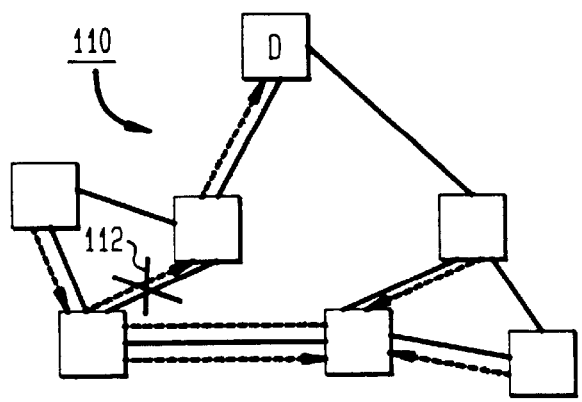
FIG. 17B shows the network tree of FIG. 17A an the presence of a link failure.

Referring to FIG. 17, a tree 110 and associated routing table are shown. First, it should be illustrated that in the case of a link failure, updating the routing tables at an affected transmitter node is not sufficient. This point is illustrated in FIG. 17A for the routing tree 110 of FIG. 17. As can be seen, when the affected PBS reroutes traffic as shown, a cycle 112 is generated in the tree, since the traffic is deflected to a PBS that transmits incoming cells back to the affected PBS in accordance with the original tree designation which is, of course, undesirable.

The optimum remedy to the problem is in calculating the optimum tree as if the failed link were disconnected, and updating the routing tables at each PBS. Various centralized or distributed algorithms exist for this purpose. Some of the applicable centralized and distributed alternatives are described.

A first issue is the detection of failure. In the case of full duplex links, a failure is detected by both ends of the link failure. However, common failures involve transmitter and receiver failures in the case of optical links, and it is therefore safe to conclude that the failures should be detected by the receiving PBS.

A second issue is the propagation of this information to an agent that will make the rerouting decision. In the case of a centralized rerouting algorithm, this agent is the central decision maker. In the case of a distributed algorithm, the information (in the form of a Failure ID) should be broadcast to all the PBSs. As the failure information is received by each node, rerouting tables are updated. For LANs, pre-stored rerouting tables indexed by a failure ID at each PBS are a suitable option. In this case, after detection, the failure ID is broadcast, and after a time-out period that allows for the message to reach all base stations, all base stations use the new routing table indexed by the failure ID, stored at network boot time. For MAN and WAN applications, the information is transmitted to the central controller, which calculates the new routing tables and informs each PBS of the updates in its routing tables. As would be understood, these restoration algorithms will be implemented using the software architecture described previously.

The following is a more detailed description of a network restoration scheme in the present ad-hoc ATM LAN. The present LAN associates a failure ID with the failure of each node or link therein. The specific failure ID is provided at the time the system is generated, and is known by every node in the system. This failure ID identifies the failed network element, i.e., a network link or a network node, by means of a single bit and indicates the transfer of its state from good to bad. By means of this bit there is also an indication of a transition from bad to good which is needed for recovery.

As can be understood, each node in the system has a view of the network as a tree where that node is at the root of the tree. FIG. 18 illustrates an exemplary network 120 having nodes A–E, wherein a variety of minimum spanning trees are shown. Network configurations 120(*a*)–(*e*) show minimum spanning trees having node A–E, respectively, as the root. These trees have the property that every node on it is at the shortest distance to the node, and all nodes in the network are on the tree. Such trees are known as minimum spanning trees. Generation of these trees from a given network topology is well-known in the art. More generally, in the present ad-hoc ATM LAN, any tree which spans all of the (PBS) nodes can be used. In the present network, each tree is given an ID number or "tree ID". Messages traversing this tree are identified by the tree ID, wherein the tree ID is mapped to an output port by a routing table at each intermediate node.

Referring to FIG. 19, there is shown an exemplary representation of a failure message 130 as the message is encapsulated into an ATM cell. The failure message 130 includes a VPI/VCI field 132 within the ATM cell header 134, wherein a predetermined VPI/VCI value is reserved for failure reporting to all nodes, for example, the value "1000". The failure message includes an ATM cell payload 136 which includes a field for the failure ID 138 and the ID of the tree (tree ID 140) the message needs to traverse. Based on the tree ID 140, the message is replicated on one or more output ports, or if it is a terminating node, the message is not propagated any further.

When the message 130 is received, an intermediate network node or PBS looks at the VPI/VCI field and characterizes the message as a failure message based on the specific value of the VPI/VCI field 132, for example 1000. The node then examines the payload 136, determines the failure ID 138 and based on the tree ID 140 determines the port to which the message should be propagated, or else, when the node is a terminating node, if the message should be propagated any further. An additional field included in the payload is a time stamp field 142. The time stamp 142 indicates the time the failure was initially detected by the node that determines the failure. A switch will then be made to new routing tables by all nodes in the network at a fixed time after this stamped time. The fixed time is chosen such that during this time, the message can propagate to all nodes in the network. The selection of this fixed time is important in that it should be long enough to allow the message to traverse the network, even under fully loaded conditions. However, the duration should also be short enough for fast recovery from failures. This time interval is set at the network generation time.

In order to minimize the time it takes for a failure identification message to travel through multiple software layers, a hardware architecture is included in the nodes that identifies a failure message 130 and caries out the above-described steps. Referring to FIG. 20A, an exemplary representation is shown for a hardware device 150 to determine if an incoming ATM cell is a failure message 130. The device includes an ATM cell buffer 152 and a second buffer 154 for storing the VPI/VCI failure value. A failure indicator 156 checks if the VPI/VCI field 132 of the incoming ATM cell is the same as the predetermined failure VPI/VCI, e.g., 1000. For this purpose, each bit in the buffer is compared with the prestored value in the second buffer 154. If the bit is the same as the prestored bit, the modulo-2 summation generates a zero. The failure indicator 156 checks for all zeros to determine if the cell belongs to a failure message. It will be understood that other comparison schemes may also be utilized for comparing the VPI/VCI field with a predetermined failure value.

Figure 20B:
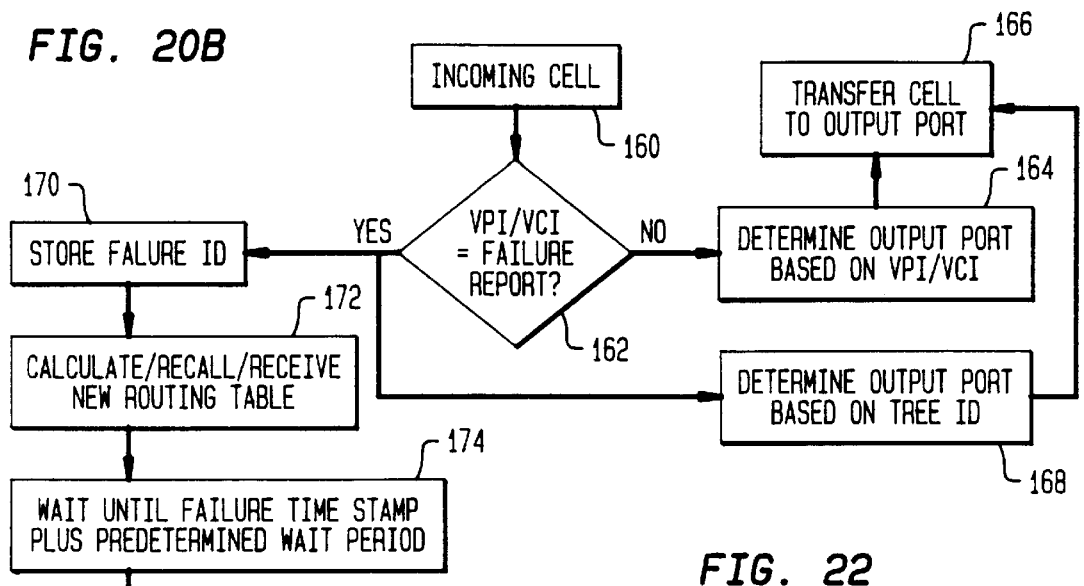
FIG. 20B shows an exemplary flow diagram for updating routing tables.

Referring to FIG. 20B, an exemplary algorithm is shown for updating of the routing tables within the network. Arrival of each ATM cell initiates the algorithm using the box "Incoming cell" 160. Many such operations can be performed in parallel. In addition, when the response to the failure decision box 162 is "yes", it will be understood that two parallel operations are performed as shown.

As discussed above, after the incoming cell is received, a PBS compares the VPI/VCI field with a predetermined value to determine whether or not this is a failure message 162. If the VPI does not indicate a failure value, an output port is determined 164 based on the VPI/VCI. The cell is then transferred to that output port 166. If it is a failure message that has been received, an output port is then determined 168 based on the tree ID 140 found in the failure message 130. After the output port is determined based on the tree ID, the cell is transferred to that output port 166.

After the failure message has been recognized, a second parallel operation is accomplished to update the routing tables in the network. Initially, the specific failure ID 138 is stored within the PBS node or somewhere else in the network 170. Based on the failure ID, the network identifies the failed element. Based on the failed element there are three alternatives for a node to perform 172. A first is that the node makes a calculation of the new routing table using a standard algorithm, such as Dijkstra or Bellman-Ford algorithms which are known in the art. Second the routing table is calculated at the network generation time and prestored. That is, for each failure ID, a complete new routing table exists in storage and the network pulls up that routing table. Third, the calculation is made or stored by an agent for a group of nodes and the information is propagated to the groups of nodes concerned by a signaling channel.

Once the new routing tables are calculated/recalled or received at step 172, the network waits a predetermined time period 174 for the failure message to traverse the network. Once this time has elapsed, the routing tables within the network are then updated 176.

B. Link Error Control

Error control in the present wireless LAN is achieved by means of physical layer and link layer protocols. As was stated above, the desire to make the PBS as simple as possible suggests an asymmetry in the protocol with the burden of complexity placed on the mobile, and not on the PBS. This places a slight additional power burden on the mobile for the processing and transmission of control messages. However, for a mobile terminal capable of processing multimedia messages with the associated encoding and decoding operations, this additional burden is not significant.

Error control can be achieved at the physical layer and at the data link layer. Although some arguments exist for leaving error control to higher layers, a decision is made to terminate the data link layer at the access-backbone boundary. This provides better utilization of the two independent wireless links, and prevents unnecessary retransmissions over a clean wireless link at a source for example, because of errors on its noisy destination counterpart.

An important consideration for this LAN is the degree of error control coding required. A significant number of cases would involve line-of-sight transmission without multipath fading and therefore, error-free transmissions. When that is the case, there is no need for any error control coding in the physical layer or in the data link layer. However, as is well known, a wireless link with multipath reception is prone to high error rates due to Rayleigh fading. In that case, heavy error control would be needed. Correspondingly, an adaptive error control scheme is opted for, where channel measurements are made based on message acknowledgments, and error control overhead is adjusted accordingly.

Typically, the physical layer is forward error controlled in hardware. For the physical layer, two options can be considered: no error control, which would be the case for line-of-sight applications, and a single-rate forward error control in hardware. To flexibly accommodate both scenarios, triggers from one state to the other are implemented based on link layer measurements using acknowledgments. Similarly, for the data link layer, the forward error correction overhead is changed based on acknowledgments of correctly received data.

The present invention discloses a reliable data link layer protocol to transport ATM cells over a wireless point-to-point link. As has been discussed, it is understood that a wireless link can have a large number of errors, whereas ATM is designed for very reliable media, such as optical fiber. The present protocol ensures that the cells are transported reliably by a sliding window transport mechanism with selective repeat automatic repeat request (ARQ) and forward error correction (FEC). The protocol minimizes ATM header overhead by means of header compression and provides per-cell FEC whose size can be changed adaptively. The protocol also provides parity cells for recovery from errors that cannot be corrected using the per-cell FEC field. The number of these cells as well as the size of a window or frame can also be adaptively changed. In addition, the window can be terminated to request an immediate acknowledgment message (ACK) and to satisfy Quality of Service (QoS) requirements.

A requirement of the sliding window-type protocol with selective repeat mechanism is that a large buffer may be needed in the mobile (or PBS) in order for cells to be delivered in sequence. With today's operating systems that deliver buffer space on request, this limitation should be easily overcome. The following describes basic elements of the protocol, it will be understood, however, that additional messages can be added without altering the basic operation, and without altering the main contribution.

Figure 21:
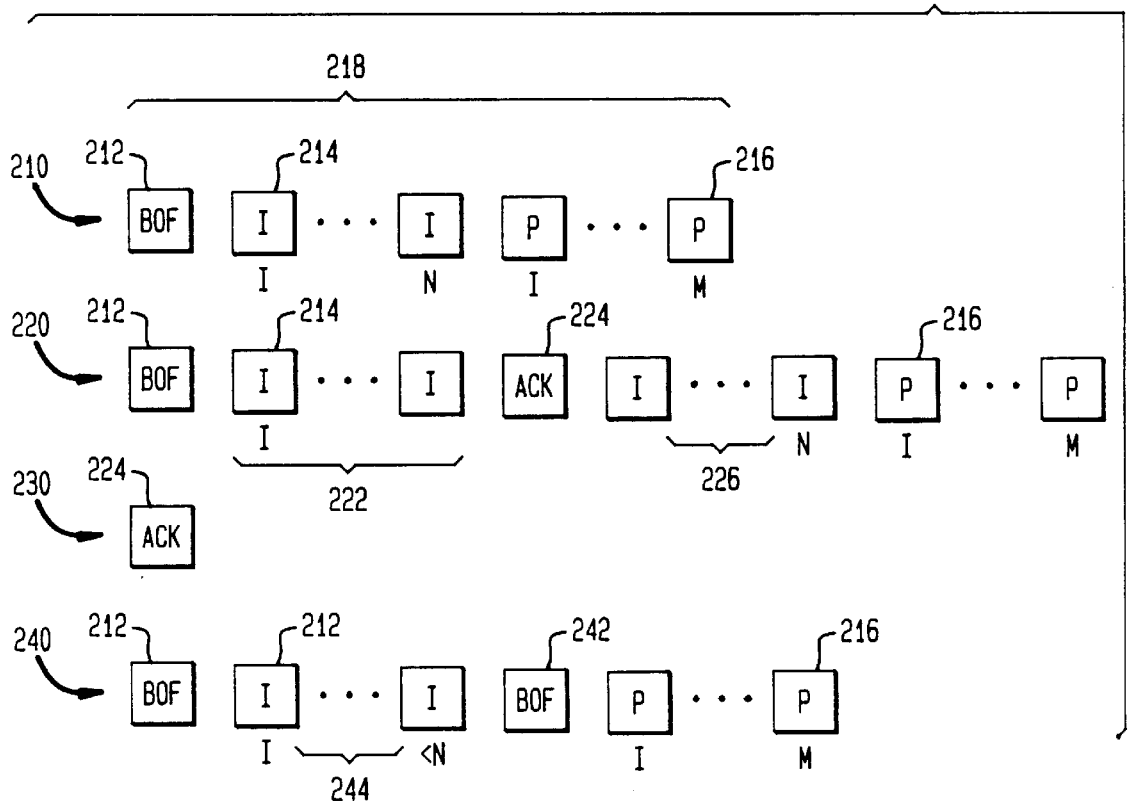
FIG. 21 shows exemplary representations of message generated in accordance with the present invention.

Referring to FIG. 21, there are shown four exemplary representations 210, 220, 230, 240 of messages in accordance with the present invention data protocol. The protocol transfers messages in a window or frame comprised of one or more ATM cells, wherein the frame may consist of three distinct messages: control, information or parity. Frame 210 is representative of a "standard" frame as viewed within the present invention protocol. Frame 210 includes a Beginning of Frame (BOF) message 212 which is considered a control message, 1–N information messages (I) 214 and 1–M parity messages (P) 216. As can be seen, the control, information and parity messages (or cells) are contained within a single window or frame 218. The size of each message within the frame may be deduced from the bits at the beginning of a message cell, as will be explained. In this way, a recipient can determine what to do to process the next message. As will be understood, the size of the window is adaptively varied depending upon the reliability of transmissions in the data link at any one time. The protocol is also full duplex.

A second exemplary frame 220 includes a BOF message 212 followed by a first section 222 of 1–N information messages 214. Another type of control message, an acknowledge message (ACK) 224 follows the first section 222 of information messages. The ACK message 224 is followed by a second section 226 of 1–N information messages 214 followed by 1–M parity messages 216. The ACK message, as will be explained, is used to acknowledge the status of received cells. In the case of frame 220, the ACK message 224 may be used for acknowledgments on the reverse link during transmission of a standard frame. Frame 230, on the other hand, is representative of an isolated ACK message 224, which may also be sent independently.

A fourth exemplary frame 240 includes and End of Frame message (EOF) 242. The EOF message 242 may be inserted within a frame in order to signify premature termination thereof. As can be seen in frame 240, an information section 244 of the frame includes less than N information messages 214 or cells, wherein the frame is terminated by the EOF message. The EOF message is followed by 1–M' parity messages. As will be explained, the number of information and parity cells N and M, respectively, is set in the BOF message 212, whereas in the fourth frame 240, the number of parity cells 216 transmitted after an EOF message is set in the EOF message.

Figure 22:
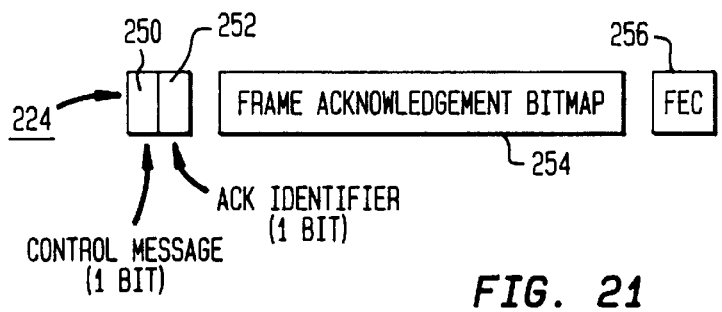
FIG. 22 shows an exemplary representation of an ACK message.

The specific format for each of the above messages will now be described in greater detail. Referring to FIG. 22, there is shown one preferred representation of a block acknowledgment (ACK) control message 224. The ACK message is transmitted from the receiver of a transmission to the transmitter of that transmission in order to acknowledge the receipt of messages. As has been described previously, there are three types of control messages, ACK, BOF and EOF. Each control message begins with a control message identified field 250 (1 bit) that is equal to 0, thereby identifying the message as a control message. A second field 252 is an ACK identifier, also 1 bit, which is set to 0 so as to identify this message as an acknowledgment message. As will be understood, the size of the message depends on the size of the frame or window which is known by both the transmitter and the receiver based on prior information exchange.

Following the identifier field is a frame acknowledgment bit map 254. The bit map in the ACK message includes a 1 for each information cell (ATM cell) that is correctly received, and a 0 for an ATM cell that is not correctly received within the window. An ATM cell that was in fact received in error, but whose errors are corrected using the per cell FEC, or by means of the parity cells is considered an ATM cell that is correctly received for the purposes of the acknowledgment message. The size of the bit map 254 is determined based on the number of information cells (1) 214 in the frame, and this is known to both the transmitter and the receiver. An FEC field 256 is appended to the ACK message following the bit map 254. The FEC field 256 includes a forward error correction code for correcting errors in the transmission. Forward error correcting is well known to those skilled in the art, and codes such as Reed-Solomon and Erasure codes may be utilized, for example, in this circumstance.

Figure 23:
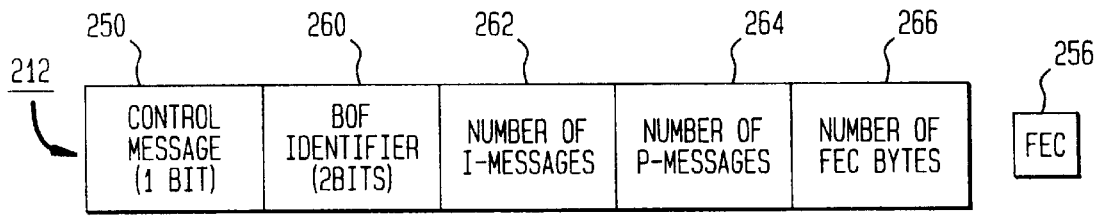
FIG. 23 shows an exemplary representation of a BOF message.

Referring to FIG. 23, there is shown an exemplary representation of a second type of control message, the beginning of frame message (BOF) 212. The BOF message 212 is transmitted at the beginning of each frame as was illustrated in FIG. 21. Following the control message identifier field 250 is the BOF identifier field 260. This field 260 is comprised of 2 bits, a first being set to a 1 and a second being set to a 0 for identification purposes of the BOF message. The BOF message 212 includes three additional fields, an information number message field 262, a parity message number field 264 and a FEC byte number field 266. The information number message field 262 indicates the number of information cells 214 in the frame. The parity message number field 264 indicates the number of parity cells in the frame, and the FEC byte number field 266 indicates the number of bytes used in the per-cell FEC. In order to minimize the overhead for these fields, information is transmitted incrementally. For example, two bits (having $2^2$ states) may be used to identify any one of the following four cases: (i) default value, (ii) same value as previous value, (iii) increment previous value, and (iv) decrement previous value. It will be understood that more bits may be added to each field in order to accommodate several default values and several increment/decrement values. For example, with a three bit field, three default values, two increment and decrement values each, and a no-change message can be accommodated, wherein it is understood that other variations are also possible. The BOF message 212 also employs a FEC field 256 following the FEC byte number field 266. The FEC field 256 is always constant or else, is given in the previous BOF.

Figure 24:
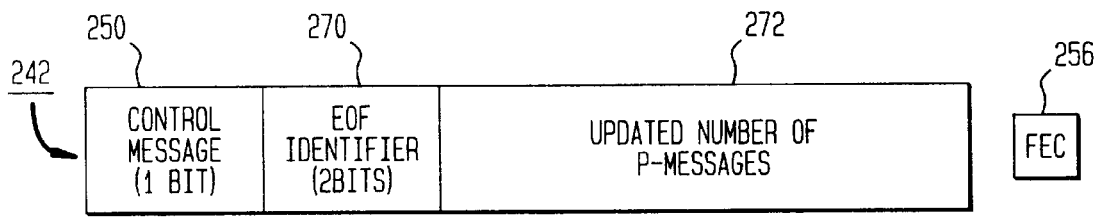
FIG. 24 shows an exemplary representation of an EOF message.

Referring to FIG. 24, there is shown an exemplary representation of an end of frame field (EOF) 242. This kind of control message is used to indicate the end of a frame when it is wished to terminate a frame prematurely, that is to override the value provide by BOF. Besides the control message identifies field 250, the EOF includes a 2 bit identifier field 270, wherein the first and second bits in this field are set to 0 and 1, respectively. An updated parity number message field 272 follows the identifier field 250. This field indicates the number of parity cells to be appended after the EOF message 242, since that number may have changed because of the termination of the frame. The EOF message 242 employs a FEC field 256 whose size is given by the previous BOF.

Figure 25:
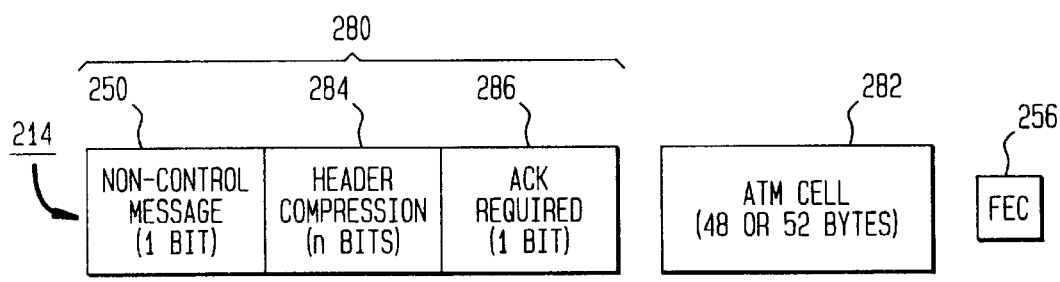
FIG. 25 shows an exemplary representation of information message.

Referring to FIG. 25, there is shown one preferred exemplary embodiment of an information message 214 in accordance with the present invention data protocol. Each information message 214 includes an information cell 282 which is prepended by an identifier field 280 containing multiple subfields. Depending on the identifier field, the information cell 282 will be a complete ATM cell, minus the header error correction (HEC) field, or only the payload of an ATM cell. A first subfield is the control message identifier field 250. In this case the control message field 250 is a 1 bit field, wherein a 1 identifies the message as a non-control message. A second field is a header compression field 284 which is used to compress the header overhead. In its simplest form, the header compression field 284 is a single bit. For one value of this bit, for example a 1, the VPI/VCI field of this cell is equal to that of the previous cell and, therefore, the header is not transmitted. For the other bit value, for example 0, the VPI/VCI field is not equal to that of the previous cell and, therefore, the full ATM cell (minus the HEC field) is transmitted.

More generally, the header compression field 284 will include n bits, wherein a PBS or mobile station include $2^{n-1}$ registers that hold VPI/VCI information. A first bit in the field will then indicate a set or read command. When a predetermined value of this bit is used to set a register, a VPI/VCI field of the ATM cell is stored in the register, and the full ATM cell (minus the HEC field) is transmitted. When this field 284 is used to read a register, the addressed register's VPI/VCI field is recalled from memory at the receiver, and therefore only the payload of the ATM cell is transmitted over the air.

As an example, a "0000" header compression field 284 contents may indicate to set Register 0 (of an 8 register field 0 through 7) with the VPI/VCI value of the existing cell. A "1000" would indicate to read register 1. Continuing with the same example, a "0001" would indicate to set Register 1 with the VPI/VCI of the existing cell, wherein a "1001" value would indicate to read Register 1. As mentioned, in the above example, 8 registers are included 0 through 7, however, it will be understood that any number of registers n may be utilized using similar header compression concepts. Here, whenever a set register value is used, a fill ATM cell (minus the HEC field) is transported. After an ATM cell is transported, and its VPI/VCI is identified either by transmission or through memory, the appropriate HEC field is added at the receiver. Another single bit subfield is included in the identifier field 280, this is the ACK required field 286. A predetermined value of this field 286 would be used by the transmitter to indicate that an acknowledgment on this cell is not expected from the receiver. This would be used, for example, with real-time message. As with each of the other messages in the present invention protocol, a per cell FEC field 256 is appended to the ATM cell within the information message.

Figure 26:
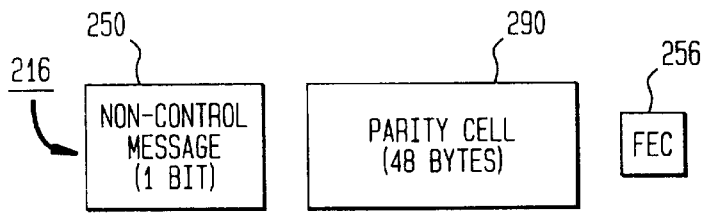
FIG. 26 shows an exemplary representation of a parity message.

Referring to FIG. 26, there is shown an exemplary representation of a parity message 216. As was illustrated in FIG. 21, parity messages 216 are placed in the frame after the last information cell 214 or the EOF cell 242. Parity cells 290 are constructed using the payloads of information cells 214 and therefore their size is equal to 48 bytes each. Parity cells 290 need not be prepended by the beginning of cell fields for parsing purposes, however to be able to insert an ACK message in between parity cells, an identification field 250 is included to identify the messages as non-control messages. A single bit control message field 250 is illustrated in FIG. 26 which is prepended to the (48 byte) parity cell. A per-cell FEC field 256 is appended to the parity cell. As would be understood, parity cells are not acknowledged.

It will also be understood that the forward error correction is achieved at three different levels, (bit-level, byte level and packet-level) by means of operations of the physical layer and the data link layer. Bit-level FEC is accomplished by physical layer error control and provides protection against random bit errors.

Byte-level FEC is accomplished by FEC overhead on each air link packet. Air link packets already have CRC overhead in order to determine whether they have been received in error. Here, a more powerful code, such as a Reed-Solomon code, is utilized and correction of errored packets without retransmissions is accomplished, based simply on the data inside the packet.

Packet-level FEC is accomplished by means of additional packets transmitted over the air, and is useful when method the byte-level FEC above does not suffice to reconstruct a packet based on the overhead in the packet. This level of FEC operates in conjunction with the automatic repeat request (ARQ) mechanism previously described. For real-time applications, such as voice or video, FEC only is preferable. For data applications, FEC operates in conjunction with retransmissions.

These methods provide increasing protection against burst errors, with more bursts being combated at each level, but with the tradeoff of higher complexity and increased delay. The bit-level is implemented in hardware, therefore the issue of complexity is essentially irrelevant. This is because it is turned on or off in order not to waste bandwidth unnecessarily.

The byte and packet-levels are implemented in software. The byte-level replaces the CRC check function, which should be performed even in the absence of FEC. Therefore, increased complexity due to FEC is tolerable and it is suggested placing this functionality symmetrically at the base and at the mobile. The packet-level requires the largest complexity and memory, and it is suggested using this for base-to-mobile transmissions, since decoding is the computationaly intensive part of FEC.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A method of restoring communications in an ATM network, said network including a plurality of network elements including network links and network switching nodes, said network switching nodes adapted for communications with wireless mobile devices, said method comprising the steps of:

generating a failure message indicative of a failure of a network element, said failure message including an identification of said network element and a predetermined VPI/VCI reserved for failure reporting, said failure based on non-receipt of data from said network element;

communicating said failure message to all said switching nodes in said network;

referencing updated routing tables at said switching nodes, wherein said network element indicated in said failure message is eliminated from routes in said network, and routing said failure message in said switching nodes of said network based on a tree identification, wherein each of said switching nodes is included in a network tree spanning all said switching nodes in said network, wherein each of said switching nodes is included as a root in a specific network tree, each said network tree having a specific tree identification, said failure message further including a tree identification field containing said specific tree identification.

2. The method of claim 1, wherein said failure message includes a time stamp indicative of the time said failure message was generated, further including the step of:

delaying a predetermined time period from the time of said time stamp before referencing said updated routing tables.

3. The method of claim 2, wherein said predetermined time period is selected to enable said failure message to propagate to all said switching nodes in said network under loaded conditions.

4. The method of claim 1, further including the step of calculating said updated routing table at said network switching nodes using a routing algorithm prior to said step of referencing.

5. The method of claim 4, wherein said routing algorithm is selected from the group consisting of Dijksta and Bellman-Ford.

6. The method of claim 1, wherein an updated routing table for each said failure identification is calculated at a time of network generation and prestored in said switching nodes.

7. The method of claim 1, wherein said updated routing tables are calculated by an agent for a group of said switching nodes, said updated routing tables being propagated to said group of switching nodes via a signaling channel.

8. The method of claim 1, wherein said network utilizes destination routing for messages propagated therein, wherein VPI/VCI destination addresses are included in a header of said message, wherein routing of said messages is based on a routing table in said switching nodes including said destination address.

9. The method of claim 1, further including the step of determining whether a message received at said switching nodes is a failure message, said step of determining including the steps of:

storing an incoming message in a buffer of said switching nodes;

performing a modulo-2 summation between each bit of a header portion of said incoming message and said predetermined VPI/VCI reserved for failure reporting; and checking said summation for all zero values, wherein all zero values indicate receipt of said failure message.

10. The method of claim 1, wherein said failure message is generated from a receiving one of said switching nodes.

11. A system for restoring communications in an ATM network, said network including a plurality of network elements including network links and network switching nodes, said network switching nodes adapted for communications with wireless mobile devices, said network utilizing destination routing for messages propagated therein, wherein VPI/VCI destination addresses are included in a header of said message, wherein routing of said messages is based on a routing table in said switching nodes including said destination address, said system comprising:

means for generating a failure message indicative of a failure of a network element, said failure message including an identification of said network element and a predetermined VPI/VCI reserved for failure reporting, said failure based on non-receipt of data from said network element;

means for communicating said failure message to all said switching nodes in said network;

means for referencing updated routing tables at said switching nodes, wherein said network element indicated in said failure message is eliminated from routes in said network;

means for routing said failure message in said switching nodes of said network based on a tree identification, said failure message including a tree identification field containing a specific tree identification, wherein each of said switching nodes is included in a network tree spanning all said switching nodes in said network, wherein each of said switching nodes is included as a root in a specific network tree, each said network tree having said specific tree identification.

12. The system of claim 11, wherein said failure message includes a time stamp indicative of the time said failure message was generated, said network nodes further including:

means operable to delay a predetermined time period from the time of said time stamp before referencing said updated routing tables.

13. The system of claim 12, wherein said predetermined time period is selected to enable said failure message to propagate to all said switching nodes in said network under loaded conditions.

14. The system of claim 11, further including means for calculating said updated routing table at said network switching nodes using a routing algorithm prior to said step of referencing.

15. The system of claim 11, wherein an updated routing table for each said failure identification is calculated at a time of network generation and prestored in said switching nodes.

16. The system of claim 12, further including a network agent for calculating said updated routing tables for a group of said switching nodes, said updated routing tables being propagated to said group of switching nodes via a signaling channel.

17. The system of claim 11, further including means for determining whether a message received at said switching nodes is a failure message, said means for determining including:

buffer means for storing an incoming message in said switching nodes;

computing means for performing a modulo-2 summation between each bit of a header portion of said incoming message and said predetermined VPI/VCI reserved for failure reporting; and means for checking said summation for all zero values, wherein all zero values indicate receipt of said failure message.

* * * * *